US010708801B2

(12) United States Patent
Van Lieshout et al.

(10) Patent No.: US 10,708,801 B2
(45) Date of Patent: *Jul. 7, 2020

(54) METHOD AND APPARATUS FOR PROCESSING STATE INFORMATION IN COMMUNICATION SYSTEM

(71) Applicant: Samsung Electronics Co., Ltd., Suwon-si (KR)

(72) Inventors: Gert Jan Van Lieshout, Middlesex (GB); Himke Van Der Velde, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,317

(22) Filed: Nov. 26, 2018

(65) Prior Publication Data

US 2019/0098526 A1    Mar. 28, 2019

Related U.S. Application Data

(63) Continuation of application No. 14/401,295, filed as application No. PCT/KR2013/004273 on May 14, 2013, now Pat. No. 10,142,873.

(30) Foreign Application Priority Data

May 14, 2012    (GB) .................................. 1208414.1

(51) Int. Cl.
*H04W 24/10* (2009.01)
*H04W 8/24* (2009.01)
(Continued)

(52) U.S. Cl.
CPC ............. *H04W 24/10* (2013.01); *H04W 8/24* (2013.01); *H04W 36/0005* (2013.01);
(Continued)

(58) Field of Classification Search
CPC ....... H04W 24/10; H04W 72/04; H04W 8/24; H04W 36/0005; H04W 72/048;
(Continued)

(56) References Cited

U.S. PATENT DOCUMENTS 9,007,933 B2    4/2015    Wu et al.
9,042,340 B2    5/2015    Rexhepi
(Continued)

FOREIGN PATENT DOCUMENTS

EP    2071882 A2    6/2009
EP    2654372 A1    10/2013
(Continued)

OTHER PUBLICATIONS

Combined Search and Examination Report Under Sections 17 & 18(3) dated Sep. 17, 2012 in connection with United Kingdom Patent Application No. GB1208414.1; 6 pages.
(Continued)

*Primary Examiner* — Faruk Hamza
*Assistant Examiner* — Aixa A Guadalupe Cruz

(57) ABSTRACT

A method of processing state information in a radio access network (100). The radio access network (100) includes a first radio access node (103, 104) that is associated with a cell (105, 106) and user equipment (102). The method comprises maintaining state information at the user equipment (102), the state information comprising at least one state information part associable with different values. The method further comprises transmitting a current value associated with at least one state information part from the user equipment (102) to the first radio access node (103, 104) in response to detecting at least one predetermined trigger indicating that the first radio access node (103, 104) may not hold the current value. The method further comprises relying on the first radio access node (103, 104) holding the current
(Continued)

value associated with the at least one state information part if no predetermined trigger is detected.

16 Claims, 5 Drawing Sheets

(51) Int. Cl.
*H04W 36/00* (2009.01)
*H04W 72/04* (2009.01)

(52) U.S. Cl.
CPC ...... *H04W 72/048* (2013.01); *H04W 36/0058* (2018.08); *H04W 36/0083* (2013.01); *H04W 36/00835* (2018.08)

(58) Field of Classification Search
CPC ......... H04W 36/0083; H04W 72/1215; H04W 16/14; H04W 74/0833; H04B 15/00
See application file for complete search history.

(56) References Cited

U.S. PATENT DOCUMENTS

| | | | |
|---|---|---|---|
| 2007/0064948 | A1 | 3/2007 | Tsirtsis et al. |
| 2007/0083669 | A1 | 4/2007 | Tsirtsis et al. |
| 2009/0170426 | A1 | 7/2009 | Jung et al. |
| 2009/0325526 | A1 | 12/2009 | Chen et al. |
| 2011/0086635 | A1 | 4/2011 | Grob-Lipski |
| 2011/0310844 | A1 | 12/2011 | Rexhepi |
| 2012/0014269 | A1 | 1/2012 | Ray et al. |
| 2012/0040620 | A1 | 2/2012 | Fu et al. |
| 2012/0176924 | A1 | 7/2012 | Wu et al. |
| 2012/0252442 | A1* | 10/2012 | Fu .......... H04W 24/10 455/426.1 |
| 2013/0114515 | A1* | 5/2013 | Koo .......... H04J 11/0023 370/329 |
| 2013/0114516 | A1 | 5/2013 | Koo et al. |
| 2013/0281096 | A1 | 10/2013 | Baghel et al. |
| 2013/0288742 | A1 | 10/2013 | Yao et al. |
| 2013/0322260 | A1 | 12/2013 | Yao et al. |
| 2013/0337815 | A1 | 12/2013 | Sebire |

FOREIGN PATENT DOCUMENTS

| | | |
|---|---|---|
| EP | 2661922 A2 | 11/2013 |
| EP | 2661938 A1 | 11/2013 |
| EP | 2665334 A1 | 11/2013 |
| KR | 10-2008-0063629 A | 7/2008 |
| KR | 10-2009-0031177 A | 3/2009 |
| WO | 2007/035436 A1 | 3/2007 |
| WO | 2007/035795 A2 | 3/2007 |
| WO | 2010/092457 A1 | 8/2010 |
| WO | 2012/093156 A1 | 7/2012 |
| WO | 2012/093901 A2 | 7/2012 |
| WO | 2012/094333 A1 | 7/2012 |
| WO | 2012/095163 A1 | 7/2012 |
| WO | 2012/097734 A1 | 7/2012 |

OTHER PUBLICATIONS

International Search Report dated Sep. 17, 2013 in connection with International Patent Application No. PCT/KR2013/004273, 3 pages.
Written Opinion of International Searching Authority dated Sep. 17, 2013 in connection with International Patent Application No. PCT/KR2013/004273, 5 pages.
Extended European Search Report issued for EP 13791487.5 dated Dec. 4, 2015, 10 pgs.
Lte Advanced, 3GPP, "3rd Generation Partnership Project; Technical Specification Group Radio Access Network; Evolved Universal Terrestrial Radio Access (E-UTRA); Study on Signalling and Procedure for Interference Avoidance for In-Device Coexistence (Release 11)", 3GPP TR 36.816 V11.1.0 (Sep. 2011) Technical Report, Sep. 26, 2011, 44 pgs.
Lte Advanced, 3GPP, "3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331 xxx.x.x (Mar. 2011) Technical Report, Mar. 30, 2011, 290 pgs.
Ericsson et al., "Signaling Procedures for IDC Avoidance", 3GPP TSG-RAN WG2 #77bis, Tdoc R2-121607, Mar. 20, 2012, 5 pgs.
Research in Motion UK Limited, "Signaling Procedures for IDC Operation", 3GPP TSG-RAN WG2 Meeting #77b, R2-121281, Mar. 17, 2012, 6 pgs.
Korean Intellectual Property Office, "Office Action," Application No. KR 10-2014-7034698, dated Nov. 20, 2019, 13 pages.
Nokia Siemens Networks, et al., "IDC Signalling to Target eNB," R2-120057, R2-115752, 3GPP TSG-RAN WG2 Meeting #77, Dresden, Germany, Feb. 6-10, 2012, 3 pages.

\* cited by examiner

METHOD AND APPARATUS FOR PROCESSING STATE INFORMATION IN COMMUNICATION SYSTEM

CROSS-REFERENCE TO RELATED APPLICATIONS

The present application is a continuation of U.S. patent application Ser. No. 14/401,295 filed on Nov. 14, 2014, which is a 371 of International Patent Application No. PCT/KR2013/004272 filed on May 14, 2013, which claims priority to United Kingdom Patent Application No. 1208414.1 filed on May 14, 2012, the disclosures of which are herein incorporated by reference in their entirety.

BACKGROUND

1. Field

The present invention relates generally to a wireless cellular communication system, and more particularly, to process state information in a radio access network including a first radio access node that is associated with a cell and user equipment,

2. Description of Related Art

Up to, and including, Release 10 (REL-10) of the Long Term Evolution (LTE) 3rd Generation Partnership Project (3GPP) specification number TS 36.300 "Evolved Universal Terrestrial Radio Access (E-UTRA) and Evolved Universal Terrestrial Radio Access Network (E-UTRAN); Overall Description; Stage 2", User Equipment (UE) reporting related to features such as Radio Link Failure (RLF) information availability, logged measurement information availability and proximity indication. It is expected that additional reporting will be introduced, for example regarding Multimedia Broadcast Multicast Services (MBMS) interest and in-device interference, in later releases.

The UE repeats reporting of such information following every cell change in connected mode, in other words following every handover or connection re-establishment. Some such information, such as RLF information and logged measurement information, is contained in mobility-related messages. Other information is (expected to be) transferred by means of a separate, dedicated message. It is expected that the UE will need to provide the E-UTRAN with more and more up-to-date information. It is expected that reporting on the part of the UE will increase, particularly following a change in cell.

It would be desirable to provide improvements in processing information relating to user equipment.

SUMMARY

The present invention has been made to address at least the above problems and/or disadvantages and to provide at least the advantages described below. Accordingly, an aspect of the present invention provides a method and apparatus for providing provide improvements in processing information relating to user equipment.

According to a first aspect of the present invention there is provided a method of processing state information in a radio access network including a first radio access node that is associated with a cell and user equipment, the method comprising: maintaining state information at the user equipment, the state information comprising at least one state information part associable with different values; transmitting a current value associated with at least one state information part from the user equipment to the first radio access node in response to detecting at least one predetermined trigger indicating that the first radio access node may not hold the current value; and relying on the first radio access node holding the current value associated with the at least one state information part if no predetermined trigger is detected.

At least one state information part may comprise an In Device Co-existence, IDC, state information part indicating an IDC interference problem for a frequency suitable for communicating with the first radio access node.

The method may further comprise receiving at the user equipment a message including configuration information from the first radio access node containing information for configuring the user equipment with at least one measurement object for at least one frequency suitable for communicating with the first radio access node, the measurement object identifying at least one frequency for the user equipment to perform measurements other than in connection with identifying IDC interference problems.

The method may further comprise receiving IDC configuration information from the first radio access node containing information for configuring the user equipment to maintain at least one IDC state information part for the at least one frequency for which the user equipment is configured with at least one measurement object and to transmit current values associated with the at least one IDC state information part to the first radio access node.

The configuration information may further contain information for configuring the user equipment with at least one reporting configuration linked to at least one measurement object, the at least one reporting configuration identifying at least one frequency for the user equipment to report measurements to the first radio access node other than in connection with identifying IDC interference problems, wherein the method further comprises the user equipment maintaining at least one IDC state information part for at least one frequency for which the user equipment is configured with a measurement object and a linked reporting configuration.

The method may further comprise the user equipment maintaining at least one IDC state information part for at least one frequency for which the user equipment is configured with a measurement object and for which the user equipment is not configured with a reporting configuration linked to that measurement object.

In accordance with one embodiment of the present invention user equipment is arranged to maintain and transmit to a first radio access node in a radio access network a current value associated with at least one state information part for at least one frequency for which the user equipment is configured with a measurement object and for which the user equipment is not configured with a reporting configuration linked to that measurement object.

At least one predetermined trigger for causing the user equipment to transmit a current value associated with at least one IDC state information part may comprise receiving new IDC configuration information from the first radio access node containing information for configuring the user equipment to maintain at least one IDC state information part for the at least one new frequency for which the user equipment is configured with at least one measurement object and to transmit current values associated with the at least one IDC state information part to the first radio access node.

At least one predetermined trigger for causing the user equipment to transmit a current value associated with at least one IDC state information part may comprise receiving new configuration information from the first radio access node containing information for configuring the user equipment with at least one measurement object for at least one new frequency suitable for communicating with the first radio access node when the user equipment was not immediately previously configured with at least one measurement object for the at least one new frequency and the user equipment is configured to maintain at least one IDC state information part for the at least one new frequency.

The new configuration information may be received upon the user equipment connecting to a new cell.

The system may further comprise a source radio access node associated with a first cell and the first radio access node comprises a target radio access node associated with a second cell and capable of receiving IDC state information from the source radio access node, and wherein the new configuration information may be received upon the user equipment changing connection from the first cell to the second cell.

Upon transmitting the current value associated with the at least one IDC state information part the user equipment may be further arranged to transmit at least one IDC state information part in connection with at least one other frequency for which the user equipment is configured to maintain at least one state information part.

Upon transmitting the current value associated with the at least one IDC state information part the user equipment may be further arranged to transmit additional IDC information arranged to assist the first radio access node in responding to the IDC interference.

The user equipment may be arranged to determine one or more frequencies unaffected by IDC interference and to transmit additional IDC information identifying the one or more unaffected frequencies.

The user equipment may be arranged to determine at least one preferred cell for which one or more frequencies not affected by IDC interference are available and for which the user equipment is arranged to provide IDC indications and which the user equipment has measurement information available other than in connection with identifying IDC interference problems.

The user equipment may be arranged to determine the at least one preferred cell by determining at least one cell having the highest signal strength to IDC interference ratio The additional IDC information may be transmitted only if the user equipment determines that the transmission of the current value associated with the IDC state information indicates that the first radio access node is likely to initiate a handover to another frequency.

In a further embodiment of the invention user equipment may be arranged to maintain and transmit a current value associated with the at least one IDC state information part, and the user equipment may be further arranged to transmit additional IDC information arranged to assist the first radio access node in responding to the IDC interference. The user equipment may be arranged to determine one or more frequencies unaffected by IDC interference and to transmit additional IDC information identifying the one or more unaffected frequencies. The user equipment may be arranged to determine at least one preferred cell for which one or more frequencies not affected by IDC interference are available on the basis of measurement information obtained other than in connection with identifying IDC interference problems available to the user equipment. The user equipment may be arranged to determine the at least one preferred cell by determining whether the measurement information exceeds a predetermined threshold or by determining at least one cell having the highest signal strength to IDC interference ratio. The additional IDC information may be transmitted only if the user equipment determines that the transmission of the current value associated with the IDC sate information indicates that the first radio access node is likely to initiate a handover to another frequency.

The at least one predetermined trigger may include one or more of: determining that the current value has not been reported to the first radio access network; and receiving, from the first radio access node, a message comprising at least one predetermined indicator from which it can be determined whether or not the first radio access node stores the current value.

The at least one predetermined indicator may comprise a version identifier indicating a version of the at least one state information part, and the method may further comprise determining that the version identifier received from the first radio access node does not correspond to the current version of the at least one state information part maintained at the user equipment.

The message may comprise a handover command or a message sent upon connection re-establishment.

The system may further comprise a source radio access node associated with one or more cells and the first radio access node comprises a target radio access node capable of receiving state information from the source radio access node, and wherein on the basis of a change of connection of the user equipment from a cell associated with the source radio access node to a cell associated with the target radio access node the at least one predetermined trigger may include or further include one or more of: determining that the target radio access node has not received the current value from the source radio access node; determining that the current value may have been reported to the source radio access node too late for the source radio access node to have transmitted it to the target radio access node; determining that the current value was reported to the source radio access node within at least one predetermined time period prior to receiving a message relating to the change in connection; determining that the current value was reported to the source radio access node within at least one predetermined time period prior to detecting a failure in a connection to the source radio access node; and determining at least one of the source radio access node and one or more radio access node to which the user equipment was previously connected since the value associated with the at least one state information part was last reported to the radio access network, does not support forwarding of state information relating to the user equipment.

The at least one predetermined time period may include one or more of: a time period associated with a handover command; a time period associated with a re-establishment procedure; a time period specified in a telecommunications standard; and a time period configured by the radio access network.

The source radio access node may operate a first radio access technology and the target radio access node operates a second, different radio access technology.

The radio access network may be an Evolved Universal Terrestrial Radio Access Network.

The radio access node may be an evolved Node B.

According to a second aspect of the present invention there is provided a method of processing state information in user equipment in a radio access network including a first radio access node that is associated with a cell and the user equipment, the method comprising: maintaining state information at the user equipment, the state information comprising at least one state information part associable with different values; detecting whether or not at least one predetermined trigger occurs indicating that the first radio access node may not hold the current value transmitting a current value associated with at least one state information part from the user equipment to the first radio access node in response to detecting at least one predetermined trigger; and relying on the first radio access node holding the current value associated with the at least one state information part if no predetermined trigger is detected.

According to a third aspect of the present invention there is provided a method of processing state information in a first radio access node in a radio access network including the first radio access node associated with a cell and user equipment, the method comprising: receiving a current value associated with at least one state information part from the user equipment in response to the user equipment detecting at least one predetermined trigger indicating that the first radio access node may not hold the current value.

According to a fourth aspect of the present invention there is provided a radio access network comprising: a first radio access node that is associated with a cell; and user equipment; wherein the user equipment is arranged to maintain state information, the state information comprising at least one state information part associable with different values; wherein the user equipment is arranged to transmit a current value associated with at least one state information part to the first radio access node in response to detecting at least one predetermined trigger indicating that the first radio access node may not hold the current value; wherein the first radio access node is arranged to receive a current value associated with at least one state information part from the user equipment in response to the user equipment detecting at least one predetermined trigger indicating that the first radio access node may not hold the current value; and wherein the user equipment is arranged to rely on the first radio access node holding the current value associated with the at least one state information part if no predetermined trigger is detected.

According to a fifth aspect of the present invention there is provided user equipment arranged to form part of a radio access network including a first radio access node that is associated with a cell: wherein the user equipment is arranged to maintain state information, the state information comprising at least one state information part associable with different values; wherein the user equipment is arranged to transmit a current value associated with at least one state information part to the first radio access node in response to detecting at least one predetermined trigger indicating that the first radio access node may not hold the current value; and wherein the user equipment is arranged to rely on the first radio access node holding the current value associated with the at least one state information part if no predetermined trigger is detected.

According to a sixth aspect of the present invention there is provided a first radio access node in a radio access network including user equipment: wherein the first radio access node is arranged to be associated with a cell; and wherein the first radio access node is arranged to receive a current value associated with at least one state information part from the user equipment in response to the user equipment detecting at least one predetermined trigger indicating that the first radio access node may not hold the current value.

According to a seventh aspect of the present invention there is provided a computer program product comprising a non-transitory computer-readable storage medium having computer readable instructions stored thereon, the computer readable instructions being executable by a computerized device to cause the computerized device to perform the above method of processing state information in a radio access network.

According to an eighth aspect of the present invention there is provided a computer program product comprising a non-transitory computer-readable storage medium having computer readable instructions stored thereon, the computer readable instructions being executable by a computerized device to cause the computerized device to perform the above method of processing state information in user equipment.

According to a ninth aspect of the present invention there is provided a computer program product comprising a non-transitory computer-readable storage medium having computer readable instructions stored thereon, the computer readable instructions being executable by a computerized device to cause the computerized device to perform the above method of processing state information in a first radio access node.

According to another aspect of the invention, there is provided a method of processing state information relating to user equipment in a communications system comprising a radio access network, the communications system comprising:

a source radio access node that is associated with one or more cells; and
a target radio access node that is associated with one or more cells and that is capable of receiving the state information from the source radio access node,
the method comprising:
maintaining current state information relating to the user equipment, the state information comprising at least one state information part associated with one or more features for which state information reporting may be configured in a cell, the at least one state information part being associable with a plurality of different values; and
on the basis of a change of connection of the user equipment from a first cell to a second cell:
transmitting a current value associated with a given state information part to the target radio access node in response to detecting at least one of one or more predetermined triggers that indicate that the target radio access node may not have received the current value from the source radio access node; or
relying on the target radio access node having received the current value from the source radio access node if said at least one of said one or more predetermined triggers is not detected.

As such, unnecessary reporting of state information may be reduced. Said relying preferably comprises not transmitting a current value associated with a given state information part to the target radio access node if said at least one of said one or more predetermined triggers is not detected.

In some embodiments, the one or more predetermined triggers include determining that the target radio access node has not received the current value from the source radio access node.

In some embodiments, the one or more predetermined triggers include determining that the current value has not been reported to the radio access network.

In some embodiments, the one or more predetermined triggers include determining that the current value may have been reported to the source radio access node too late for the source radio access node to have transmitted it to the target radio access node.

In some embodiments, the at least one trigger includes determining that the current value was reported to the source radio access node within at least one predetermined time period prior to receiving a message relating to the change in connection.

In some embodiments, the at least one predetermined time period includes a time period associated with a handover command.

In some embodiments, the message comprises a handover command.

In some embodiments, the at least one trigger includes determining that the current value was reported to the source radio access node within at least one predetermined time period prior to detecting a failure in a connection to the source radio access node.

In some embodiments, the at least one predetermined time period includes a time period associated with a re-establishment procedure.

In some embodiments, the at least one predetermined time period includes a time period specified in a telecommunications standard.

In some embodiments, the at least one predetermined time period includes a time period configured by the radio access network.

In some embodiments, the one or more predetermined triggers include receiving, from the target radio access node, a message comprising at least one predetermined indicator from which it can be determined whether or not the target radio access node has received the current value from the source radio access node.

In some embodiments, the at least one predetermined indicator comprises a version identifier indicating a version of the given state information part.

In some embodiments, the one or more predetermined triggers include determining that the version identifier received from the target radio access node does not correspond with a current version of the given state information part.

Some embodiments comprise:
including a version identifier indicating a version of the given state information part when reporting the value associated with the given state information part to the radio access network.

Some embodiments comprise:
including a version identifier indicating a version of the given state information part when reporting a change in the value associated with the given state information part to the radio access network.

Some embodiments comprise:
advancing the version identifier indicating the version of the given state information part upon transmitting the change in the value associated with the given state information part to the radio access network.

In some embodiments, the version identifier is a common version identifier that indicates a version of both the given state information part and at least one additional state information part.

Some embodiments comprise:
including the common version identifier when reporting the value associated with the given state information part and/or the at least one additional state information part to the radio access network.

Some embodiments comprise:
including the common version identifier when reporting a change in the value associated with the given state information part and/or the at least one additional state information part to the radio access network.

Some embodiments comprise:
advancing the common version identifier upon transmitting a change in the value associated with the given state information part and/or the at least one additional state information part to the radio access network.

In some embodiments, the one or more predetermined triggers include:
determining that the common version identifier received from the target radio access node does not correspond with a current common version of the given state information part and the at least one additional state information part; and
determining that the value currently associated with the given state information part is different from the value associated with a version of the given state information part as indicated by the received common version identifier.

In some embodiments, the message received from the target radio access node relates to handover.

In some embodiments, the message received from the target radio access node relates to a connection re-establishment procedure.

In some embodiments, the given state information part is associable with a version identifier that indicates a version of the given state information part and the at least one predetermined indicator includes a predetermined version identifier value.

In some embodiments, the given state information part is associable with a version identifier that indicates a version of the given state information part and the at least one predetermined indicator includes the absence of a version identifier associated with the given state information part.

In some embodiments, the at least one trigger includes determining that the source radio access node, and/or or one more radio access nodes to which the user equipment was previously connected since the value currently associated with the given state information part was reported to the radio access network, does not support forwarding of state information relating to the user equipment.

Some embodiments comprise:
transmitting the value currently associated with the given state information part to the target radio access node in response to said detecting at least one predetermined trigger only if the given state information part is associated with one or more features for which state information reporting is configured in the second cell.

In some embodiments, the given state information part is associated with one or more features for which state information reporting is configured in both the first cell and the second cell.

In some embodiments, the given state information part is associated with one or more features for which state information reporting is configured in the second cell and for which state information reporting is not configured in the first cell.

In some embodiments, the at least one trigger includes determining that the given state information part is associated with one or more features for which state information reporting is configured in the second cell and for which state information reporting is not configured in the first cell.

Some embodiments comprise:
transmitting an additional current value associated with a further given state information part to the target radio access node in response to detecting at least one of one or more predetermined triggers that indicate that the target radio access node may not have received the additional current value from the source radio access node; and relying on the target radio access node having received the additional current value from the source radio access node if said at least one of said one or more predetermined triggers is not detected.

In some embodiments, at least the current value and the additional current value are included in a single message to the target radio access node.

In some embodiments, the radio access network is an Evolved Universal Terrestrial Radio Access Network.

In some embodiments, one or both of the source radio access node and the target radio access node is an evolved Node B.

In some embodiments, the source radio access node operates a first radio access technology and the target radio access node operates a second, different radio access technology.

According to another aspect of the invention, there is provided a method of processing state information relating to user equipment in a communications system comprising a radio access network, the communications system comprising:
a target radio access node that is associated with one or more cells and that is capable of receiving state information from a source radio access node that is associated with one or more cells; and
user equipment that is configured to maintain current state information relating to the user equipment, the state information comprising at least one state information part associated with one or more features for which state information reporting may be configured in a cell, the at least one state information part being associable with a plurality of different values, the method comprising, at the source radio access node:
receiving state information relating to the user device; and
transmitting at least part of the received state information to the target radio access node, whereby, on the basis of a change of connection of the user equipment from a first cell to a second cell:
the user equipment transmits a current value associated with a given state information part to the target radio access node in response to detecting at least one of one or more predetermined triggers that indicate that the target radio access node may not have received the current value from the source radio access node; or the user equipment relies on the target radio access node having received the current value from the source radio access node if said at least one of said one or more predetermined triggers is not detected.

As such, unnecessary reporting of state information may be reduced.

Some embodiments comprise:
transmitting the at least part of the received information in a message associated with the change in connection from the source radio access node to the target radio access node. In some embodiments, the message comprises a handover preparation message.

Some embodiments comprise:
including the at least part of the received state information in an Access Stratum (AS)-context field in the handover preparation message.

Some embodiments comprise:
including the at least part of the received state information in an information container, the information container being a variable size string.

Some embodiments comprise:
receiving state information reports from the user equipment, the state information reports identifying changes to the state information relating to the user equipment.

Some embodiments comprise:
receiving a version identifier indicating a version of at least part of the state information when the user equipment reports a value associated with the at least part of the state information.

Some embodiments comprise:
receiving a version identifier indicating a version of at least part of the state information when the user equipment reports a change in the value associated with the at least part of the state information.

Some embodiments comprise:
receiving at least some of the received state information from a radio access node to which the user equipment was previously connected.

In some embodiments, at least a part of the received state information is not comprehensible by the source radio access node.

According to another aspect of the invention, there is provided a method of processing state information relating to user equipment in a communications system comprising a radio access network, the communications system comprising:
a source radio access node that is associated with one or more cells; and
user equipment that is configured to maintain current state information relating to the user equipment, the state information comprising at least one state information part associated with one or more features for which state information reporting may be configured in a cell, the at least one state information part being associable with a plurality of different values,
the method comprising, at a target radio access node that is associated with one or more cells and that is capable of receiving the state information from the source radio access node, on the basis of a change of connection of the user equipment from a first cell to a second cell:
receiving a current value associated with a given state information part from the user equipment in response to the user equipment detecting at least one of one or more predetermined triggers that indicate that the current value from the source radio access node may not have been received at the target radio access node; or
relying on having received the current value from the source radio access node if said at least one of said one or more predetermined triggers is not detected.

As such, unnecessary reporting of state information may be reduced.

Some embodiments comprise:
transmitting a message comprising at least one predetermined indicator from which it can be determined whether or not the target radio access node has received the current value from the source radio access node.

In some embodiments, the at least one predetermined indicator comprises a version identifier indicating a version of the given state information part.

Some embodiments comprise:
receiving at least the version identifier from the source radio access node.

In some embodiments, the version identifier is a common version identifier that indicates a version of both the given state information part and at least one additional state information part.

In some embodiments, the message received relates to handover.

In some embodiments, the message received relates to a connection re-establishment procedure.

In some embodiments, the given state information part is associable with a version identifier that indicates a version of the given state information part and wherein the at least one predetermined indicator includes a predetermined version identifier.

In some embodiments, the given state information part is associable with a version identifier that indicates a version of the given state information part and wherein the at least one predetermined indicator includes the absence of a version identifier associated with the given state information part.

Some embodiments comprise:

receiving at least some of the state information relating to the user equipment in a message associated with the change in connection from the source radio access node.

In some embodiments, the message comprises a handover preparation message.

According to another aspect of the invention, there is provided apparatus for processing state information relating to user equipment in a communications system comprising a radio access network, the communications system comprising:

a source radio access node that is associated with one or more cells; and a target radio access node that is associated with one or more cells and that is capable of receiving the state information from the source radio access node, the apparatus being configured to:

maintain current state information relating to the user equipment, the state information comprising at least one state information part associated with one or more features for which state information reporting may be configured in a cell, the at least one state information part being associable with a plurality of different values; and on the basis of a change of connection of the user equipment from a first cell to a second cell:

transmit a current value associated with a given state information part to the target radio access node in response to detecting at least one of one or more predetermined triggers that indicate that the target radio access node may not have received the current value from the source radio access node; or rely on the target radio access node having received the current value from the source radio access node if said at least one of said one or more predetermined triggers is not detected.

According to another aspect of the invention, there is provided apparatus for processing state information relating to user equipment in a communications system comprising a radio access network, the communications system comprising:

a target radio access node that is associated with one or more cells and that is capable of receiving state information from a source radio access node that is associated with one or more cells; and user equipment that is configured to maintain current state information relating to the user equipment, the state information comprising at least one state information part associated with one or more features for which state information reporting may be configured in a cell, the at least one state information part being associable with a plurality of different values, the apparatus being configured to:

receive state information relating to the user device; and transmit at least part of the received state information to the target radio access node, whereby, on the basis of a change of connection of the user equipment from a first cell to a second cell:

the user equipment transmits a current value associated with a given state information part to the target radio access node in response to detecting at least one of one or more predetermined triggers that indicate that the target radio access node may not have received the current value from the apparatus; or the user equipment relies on the target radio access node having received the current value from the apparatus if said at least one of said one or more predetermined triggers is not detected.

According to another aspect of the invention, there is provided apparatus for processing state information relating to user equipment in a communications system comprising a radio access network, the communications system comprising:

a source radio access node that is associated with one or more cells; and user equipment that is configured to maintain current state information relating to the user equipment, the state information comprising at least one state information part associated with one or more features for which state information reporting may be configured in a cell, the at least one state information part being associable with a plurality of different values, the apparatus being associated with one or more cells, being capable of receiving the state information from the source radio access node, and being configured to, on the basis of a change of connection of the user equipment from a first cell to a second cell:

receive a current value associated with a given state information part from the user equipment in response to the user equipment detecting at least one of one or more predetermined triggers that indicate that the current value from the source radio access node may not have been received at the target radio access node; or rely on having received the current value from the source radio access node if said at least one of said one or more predetermined triggers is not detected.

According to another aspect of the invention, there is provided a computer program product comprising a non-transitory computer-readable storage medium having computer readable instructions stored thereon, the computer readable instructions being executable by a computerized device to cause the computerized device to perform a method of processing state information relating to user equipment in a communications system comprising a radio access network, the communications system comprising:

a source radio access node that is associated with one or more cells; and a target radio access node that is associated with one or more cells and that is capable of receiving the state information from the source radio access node, the method comprising:

maintaining current state information relating to the user equipment, the state information comprising at least one state information part associated with one or more features for which state information reporting may be configured in a cell, the at least one state information part being associable with a plurality of different values; and on the basis of a change of connection of the user equipment from a first cell to a second cell:

transmitting a current value associated with a given state information part to the target radio access node in response to detecting at least one of one or more predetermined triggers that indicate that the target radio access node may not have received the current value from the source radio access node; or relying on the target radio access node having received the current value from the source radio access node if said at least one of said one or more predetermined triggers is not detected.

According to another aspect of the invention, there is provided computer program product comprising a non-transitory computer-readable storage medium having computer readable instructions stored thereon, the computer readable instructions being executable by a computerized device to cause the computerized device to perform a method of processing state information relating to user equipment in a communications system comprising a radio access network, the communications system comprising:

a target radio access node that is associated with one or more cells and that is capable of receiving state information from a source radio access node that is associated with one or more cells; and user equipment that is configured to maintain current state information relating to the user equipment, the state information comprising at least one state information part associated with one or more features for which state information reporting may be configured in a cell, the at least one state information part being associable with a plurality of different values, the method comprising, at the source radio access node:

receiving state information relating to the user device; and transmitting at least part of the received state information to the target radio access node, whereby, on the basis of a change of connection of the user equipment from a first cell to a second cell:

the user equipment transmits a current value associated with a given state information part to the target radio access node in response to detecting at least one of one or more predetermined triggers that indicate that the target radio access node may not have received the current value from the source radio access node, or the user equipment relies on the target radio access node having received the current value from the source radio access node if said at least one of said one or more predetermined triggers is not detected.

According to another aspect of the invention, there is provided a computer program product comprising a non-transitory computer-readable storage medium having computer readable instructions stored thereon, the computer readable instructions being executable by a computerized device to cause the computerized device to perform a method of processing state information relating to user equipment in a communications system comprising a radio access network, the communications system comprising:

a source radio access node that is associated with one or more cells; and user equipment that is configured to maintain current state information relating to the user equipment, the state information comprising at least one state information part associated with one or more features for which state information reporting may be configured in a cell, the at least one state information part being associable with a plurality of different values, the method comprising, at a target radio access node that is associated with one or more cells and that is capable of receiving the state information from the source radio access node, on the basis of a change of connection of the user equipment from a first cell to a second cell:

receiving a current value associated with a given state information part from the user equipment in response to the user equipment detecting at least one of one or more predetermined triggers that indicate that the current value from the source radio access node may not have been received at the target radio access node; or relying on having received the current value from the source radio access node if said at least one of said one or more predetermined triggers is not detected.

According to another aspect of the invention, there is provided a method of operating a user equipment in a communications system comprising at least one cell that is controlled by a radio access node, the method comprising:

maintaining current state information relating to the user equipment, the state information comprising at least one state information part associated with one or more features for which state information reporting may be configured in the at least one cell, the at least one state information part being associable with a plurality of different values;

receiving an indication from the radio access node regarding state information held by the radio access node relating to the user equipment;

determining whether to report current state information relating to the user equipment to the radio access node on the basis of the received indication; and reporting a current value associated with at least a given state information part to the radio access node in response to determining that current state information relating to the user equipment should be transmitted on the basis of the received indication.

As such, unnecessary reporting of state information may be reduced. If the determination based on the received indication is that no reporting is required, or if no indication is received, the user equipment preferably refrains from transmitting a current value associated with a given state information part to the radio access node.

In some embodiments, the determining includes determining that the current value has not yet been received by the radio access node.

In some embodiments, the received indication comprises a version identifier indicating a version of the given state information part held by the radio access node.

Some embodiments comprise including the determining includes determining that the version identifier does not correspond with a current version of the given state information part.

Some embodiments comprise including a version identifier indicating the current version of the given state information part when reporting the value associated with the given state information part to the radio access node.

Some embodiments comprise advancing the version identifier indicating the current version of the given state information part upon reporting the value associated with the given state information part to the radio access node.

In some embodiments, the version identifier indicating a version of the given state information part held by the radio access node is a common version identifier that indicates a version of both the given state information part and at least one additional state information part.

Some embodiments comprise reporting the value associated with the given state information part and a value associated with the at least one additional state information part to the radio access node.

Some embodiments comprise including a common version identifier when reporting the value associated with the given state information part and the value associated with the at least one additional state information part to the radio access node.

In some embodiments, the indication is received from the radio access node on the basis of a change of connection of the user equipment from a first cell in the communications system to a second cell in the communications system.

According to another aspect of the invention, there is provided user equipment for use in a communications system comprising at least one cell that is controlled by a radio access node, the user equipment comprising:

a data store for maintaining current state information relating to the user equipment, the state information comprising at least one state information part associated with one or more features for which state information reporting may be configured in the at least one cell, the at least one state information part being associable with a plurality of different values;

a radio interface for receiving an indication from the radio access node regarding state information held by the radio access node relating to the user equipment, and for reporting state information to the radio access node; and a processor configured to determine whether to report current state information relating to the user equipment to the radio access node on the basis of the received indication, and for reporting a current value associated with at least a given state information part to the radio access node in response to determining that current state information relating to the user equipment should be transmitted on the basis of the received indication.

According to another aspect of the invention, there is provided a method of operating a user equipment in a radio access network comprising cells that are controlled by radio access nodes, the method comprising:

maintaining current state information relating to the user equipment, the state information comprising at least one state information part associated with one or more features for which state information reporting may be configured in a cell, the at least one state information part being associable with a plurality of different values;

initiating first reporting of a current value associated with at least a given state information part to a radio access node;

activating a timer on the basis of the initiation of the first reporting;

determining whether to initiate second reporting of the current value to a radio access node on the basis of one or more predetermined triggers; and initiating second reporting of the current value in response to detection of one of said of one or more predetermined triggers before expiry of a timing period measured by said timer.

As such, unnecessary reporting of state information may be reduced. If the timing period measured by said timer expires without detection of one of said of one or more predetermined triggers, the user equipment preferably refrains from transmitting a current value associated with a given state information part to the radio access node, and a radio access node may obtain the value by other means, such as by transfer of the information from another radio access node. The current value associated with a given state information part then does not need to be transmitted over the air interface if the user equipment refrains from such transmission. Since a significant amount of state information might otherwise require to be transmitted repeatedly over the air interface, this can result in significant improvements in efficiency of use of the bandwidth available over the radio interface. Nevertheless, if one of said of one or more predetermined triggers is detected before expiry of the timing period measured by said timer, the current value associated with a given state information part may then be transmitted, to ensure that the radio access node currently serving the user equipment has access to the state information required for improved operation of the user equipment.

In some embodiments, said one or more predetermined triggers comprise failure of a connection between the user equipment and the radio access network.

In some embodiments said one or more predetermined triggers comprises a message associated with handover between cells of the radio access network.

According to another aspect of the invention, there is provided user equipment for use in a radio access network comprising cells that are controlled by radio access nodes, the user equipment comprising:

a data store for maintaining current state information relating to the user equipment, the state information comprising at least one state information part associated with one or more features for which state information reporting may be configured in a cell, the at least one state information part being associable with a plurality of different values; and a processor configured to:

initiate first reporting of a current value associated with at least a given state information part to a radio access node;

activate a timer on the basis of the initiation of the first reporting;

determine whether to initiate second reporting of the current value to a radio access node on the basis of one or more predetermined triggers; and initiate second reporting of the current value in response to detection of one of said of one or more predetermined triggers before expiry of a timing period measured by said timer.

Further features and advantages of the invention will become apparent from the following description of preferred embodiments of the invention, given by way of example only, which is made with reference to the accompanying drawings.

Advantages, and salient features of the invention will become apparent to those skilled in the art from the following detailed description, which, taken in conjunction with the annexed drawings, discloses exemplary embodiments of the invention.

DETAILED DESCRIPTION

Figure 1:
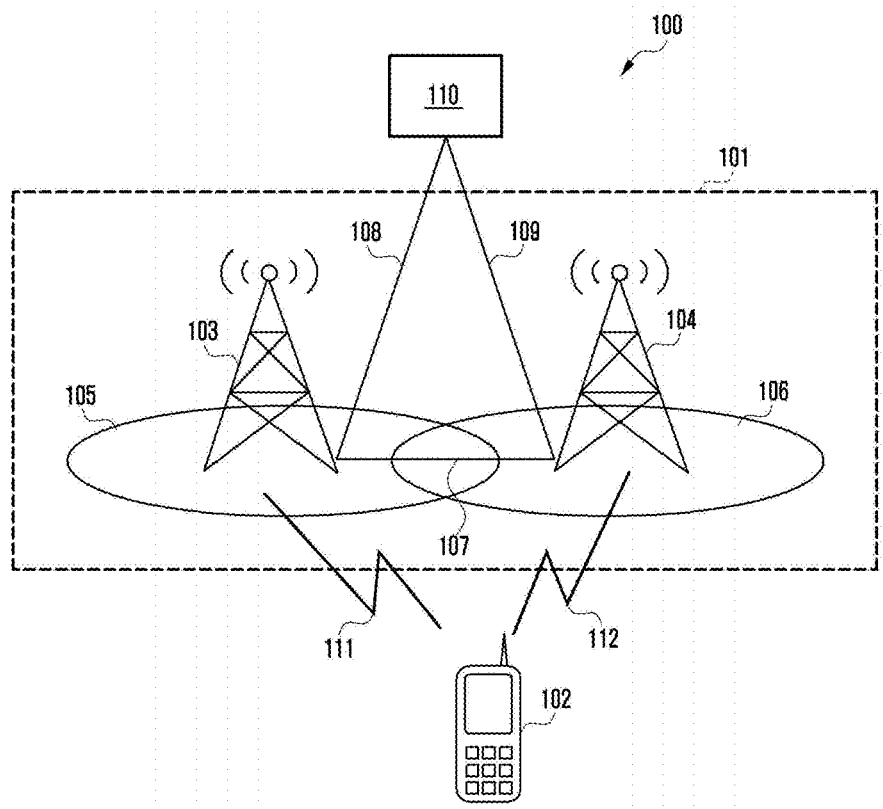
FIG. 1 is a block schematic representation of a communications system according to some embodiments.

FIG. 1 is a block schematic representation of a communications system 100 according to some embodiments.

The communications system 100 includes a radio access network, generally indicated in a dotted box in FIG. 1 and designated by reference 101. In some embodiments, the radio access network 101 comprises an E-UTRAN. At least some embodiments are intended to be applicable to release 11 (REL-11) and beyond of the E-UTRA. However, at least some embodiments may be applicable to other releases of the E-UTRA and/or other (radio access) systems.

The communications system 100 includes User Equipment (UE) 102. In some embodiments, the UE 102 is a mobile telephony device. However, other types of UE 102 are envisaged.

The radio access network 101 includes first and second radio access nodes 103, 104. The first and second radio access nodes 103, 104 control at least respective first and second cells 105, 106. It will be appreciated that one or both of the first and second radio access nodes 103, 104 may control more than one cell. The first and second radio access nodes 103, 104 may be communicatively coupled by means of one or more interfaces 107, 108, and 109.

In some embodiments, the radio access nodes 103, 104 are evolved Node Bs (eNodeBs or eNBs). In such embodiments, the radio access nodes 103, 104 may be able to interact directly with each other via an X2 interface 107 and/or indirectly via respective S1 interfaces 108, 109 to a Core Network (CN) 110. In some embodiments, the first radio access node 103 operates a first Radio Access Technology (RAT) and the second radio access node 104 operates a second, different RAT.

The UE 102 communicates with the first radio access node 103 via a first radio link 111 and communicates with the second radio access node 104 via a second radio link 112.

It will be appreciated that the communications system 100 may include more than one UE 102 and the radio access network 101 may include more than two radio access nodes and associated cells.

In some embodiments, one of the first and second radio access nodes, in this case the first radio access node 103, is a source radio access node 103 that is associated with a first cell 105. The source radio access node 103 may be configured to transmit state information relating to the UE 102. The other of the first and second radio access nodes, in this case the second radio access node 104, is a target radio access node 104 that is associated with a second cell 106. The target radio access node 104 is capable of receiving the state information from the source radio access node 103. The source radio access node 103 is configured to transmit the state information to the target radio access node 104 via the at least one interface 107, 108, 109 between the source radio access node 103 and the target radio access node 104.

The UE 102 is configured to maintain current state information relating to the UE 102. The state information comprises at least one state information part that is associated with one or more features for which state information reporting may be configured in the first cell 105 and/or the second cell 106. The at least one state information part is associable with a plurality of different values. The state information may be at least partly dynamic.

In some embodiments, the state information comprises status information relating to the UE 102, for example relating to proximity to a Closed Subscriber Group (CSG) cell, interest in MBMS services or in-device interference. In some embodiments, the state information comprises UE capability information, i.e. capability information relating to the UE 102, which is dynamic and may change, for example support for RLF information availability and/or logged measurement information availability, UE category information, or power class (which may change for example with the device is plugged into an external power source). One or more elements of the UE capability information may reflect the data rate that the UE currently supports. The current state of this information may depend on a task the UE 102 is performing e.g. playing a game, doing navigation, etc. In such cases the UE capabilities may change, dependent on the current operational state of the UE 102.

Other types of state information that the UE 102 may report to the radio access network 101 are contemplated.

In some cases, the connection may change from the first cell 105 to the second cell 106. The connection may change, for example, as a result of a handover or as a result of re-establishment following a connection failure. The UE 102 may detect such a connection change, for example by receiving a handover command or by detecting the connection failure. In embodiments in which the source radio access node 103 operates a first RAT and the target radio access node 104 operates a second, different RAT, this change in connection may be referred to as an inter-RAT cell change.

In some embodiments, the source radio access node 103 receives state information relating to the UE 102 and transmits the received state information to the target radio access node 104.

In some embodiments, the source radio access node 103 is configured to transmit at least part of the state information in a message associated with the change in connection. Thus, in some embodiments, as part of the change in connection (for example as part of handover preparation), the source radio access node 103 provides the state information to the target radio access node 104. In some embodiments, the message associated with the change in connection comprises a handover preparation message. In some embodiments, the source radio access node 103 is configured to include the at least part of the received state information in an Access Stratum (AS)-context field in a handover preparation message. Thus, in some embodiments, the at least part of the state information may be included in the AS-context field in a HandoverPreparationInformation message. In some embodiments, the source radio access node 103 is configured to include the at least part of the state information in an information container, the information container being a variable size string.

In some embodiments, the source radio access node 103 receives state information reports from the UE 102. The state information reports identify changes to the state information relating to the UE 102. In some embodiments, the UE 102 transmits state information reports only in the event of a change to at least part of the state information.

Some embodiments comprise receiving at least some of the state information from a radio access node (not shown in FIG. 1; see FIGS. 3 to 5) to which the UE 102 was previously connected.

In some cases, the state information received from the previous radio access node is not comprehensible by the source radio access node 103, for example because the source radio access node 103 and the previous radio access node may support different specification releases and/or functionality. By implementing backwards compatibility in protocols, the radio access nodes may still be able to cooperate for the functionality supported by both radio access nodes. Whenever the protocols evolve, extension fields may be introduced for newly added functionality. Backwards compatibility may be provided by configuring radio access nodes that do not support such newly added functionality and/or do not comprehend the associated extension fields or parameters to ignore the extensions or parameters, as the case may be. Nodes that support transparent transfer or forwarding may be able to identify the end of the state information, for example based on the size of the container in which the state information is included, without having to comprehend the details of the state information (which is otherwise needed when using packed encoding rules (PER)).

In some cases, it may not seem beneficial or even desirable, to introduce 'transparent forwarding' of state information from a previous radio access node to the source radio access node 103 when the state information is not comprehensible by the source radio access node 103 since such transparent forwarding would allow forwarding of state information to nodes that do not comprehend the state information. While connected to such nodes, the UE 102 cannot provide state information reports and, hence, the forwarded state information might be out-dated when it reaches the next radio access node. In such cases, the transfer of state information transparently may only serve to increase overall signalling in the radio access network 101, which is generally undesirable.

However, in some cases, transparent forwarding may be desirable. For example, it may typically be more difficult to upgrade femto radio access nodes than it is to upgrade macro radio access nodes. Consequently, it is quite possible that a femto radio access node would conform to an earlier (older) specification release than a macro radio access node. If the UE 102 operates on a frequency in which femto radio access nodes are deployed, the UE 102 may regularly connect to a radio access node that uses an old release that may not support state information reporting. Since femto cells are relatively small, the stay by the UE 102 in such cells may be rather short. Thus, it is quite possible that after passing through a femto cell, the UE 102 status is still valid. In such cases, it may be desirable to provide support for transparent forwarding of the state information by nodes that support transparent transfer but that may not support state information reporting in relation to features for which state information reporting is added in later releases.

As explained above, is generally desirable that unnecessary state information reporting by the UE 102 be minimised. As such, the UE 102 is configured to transmit a current value associated with a given state information part to the target radio access node 104 in response to detecting at least one of one or more predetermined triggers that indicate that the target radio access node 104 may not have received the current value from the source radio access node 103. The UE 102 relies on the target radio access node 104 having received the current value from the source radio access node 103 if said at least one of said one or more predetermined triggers is not detected. Thus, in some embodiments, the at least one predetermined trigger acts as an indicator that the target radio access node 104 may not have received, is unlikely to have received, or has not received, the current value from the source radio access node 103. In such cases, the UE 102 can report the current value to the target radio access node 104 so that the target radio access node 104 has up-to-date state information relating to the UE.

In some embodiments, the one or more predetermined triggers include determining that the target radio access node 104 has not received the current value from the source radio access node 103. In such embodiments, the UE 102 reports the current value to the target radio access node 104 so that the target radio access node 104 has up-to-date state information relating to the UE 102.

In some embodiments, the one or more predetermined triggers include determining that the current value has not been reported to the radio access network 101. In such embodiments, the UE 102 may determine that the target radio access node 104 has not received the current value, since the current value has not been reported. In response to detecting such a trigger, the UE 102 reports the current value to the target radio access node 104 so that the target radio access node 104 has up-to-date state information relating to the UE 102

In some embodiments, the one or more predetermined triggers include determining that the current value may have been reported to the source radio access node 103 too late for the source radio access node 103 to have transmitted it to the target radio access node 104. It is possible that the value associated with the given state information part and/or other state information relating to the UE 102 changes after the source radio access node 103 has provided the latest state information it has relating to the UE 102 to the target radio access node 104. This situation is generally referred to herein as a "late change". In such a situation, the UE 102 may be configured to report the updated state information immediately following a cell change. Thus, in some embodiments, in the event that the state information has changed after the source radio access node 103 provided the state information relating to the target radio access node 104 (a late change), the UE 102 provides (again) the updated state information to the target radio access node 104, possibly immediately, following a handover or other change in connection.

However, the UE 102 may not know when exactly the source radio access node 103 provided the latest state information it had relating to the UE 102 to the target radio access node 104. Accordingly, various mechanisms are provided by means of which the UE 102 can detect whether a late change occurred. Two such mechanisms are discussed below: a timer-based scheme and a scheme in which version information is exchanged between the UE 102 and the radio access network 101. Other suitable mechanisms may, however, be used.

For UEs 102 in connected mode, the radio access network 101 typically initiates a cell change in response to a measurement report from the UE 102 indicating that the current serving cell is not optimal from a radio perspective. It is, however, also possible for the radio access network 101 to initiate a cell change for other reasons, for example the cell load. In such cases, handover may not be preceded by a measurement report. This is often referred to as a 'blind handover'. In such cases, the UE 102 cannot use the measurement report message as a rough indication of the time at which the source radio access node 103 is likely to have initiated handover preparation and have provided the latest state information it had relating to the UE 102 to the target radio access node 104. As such, the UE 102 may employ a timer to detect the occurrence of a late change.

In some embodiments, the one or more predetermined triggers include determining that the current value was reported to the source radio access node 103 within at least one predetermined time period prior to receiving a message relating to the change in connection. In some embodiments, the one or more predetermined triggers include determining that the current value was reported to the source radio access node 103 within at least one predetermined time period prior to detecting a failure in a connection to the source radio access node. Thus, in some embodiments, in the event that the state information has changed within a certain time period before the UE 102 receives the handover command or detects a failure with respect to the source radio access node 103, the UE 102 provides the updated state information to the target radio access node 104, possibly immediately, following handover or re-establishment as the case may be.

In some embodiments, the at least one predetermined time period includes a time period specified in a telecommunications standard, for example in one or more releases of 3GPP specification number TS 36.300. In some embodiments, the at least one predetermined time period includes a time period configured by the radio access network 101. Thus, in some embodiments, the time period during which a change in state information would trigger the UE 102 to provide an update may either by fixed (for example a value specified in the standard) or may be configured by the radio access network 101.

In some embodiments, the at least one predetermined time period includes a time period associated with a handover message. In some embodiments, the at least one predetermined time period includes a time period associated with a connection re-establishment procedure. Thus, in some embodiments, for handover and re-establishment, different time periods, during which a change in state information would trigger the UE 102 to provide an update, may be used.

In some embodiments, the one or more predetermined triggers include receiving, from the target radio access node 104, a message comprising at least one predetermined indicator from which it can be determined whether or not the target radio access node 104 has received the current value from the source radio access node 103. In such embodiments, the UE 102 can use the at least one predetermined indicator to determine whether or not the target radio access node 104 has received the current value from the source radio access node 103.

Another mechanism for the detection of late changes of UE state information upon handover or other changes in connection is for the UE 102 to provide a version identifier when reporting the state information. Thus, in some embodiments, the at least one predetermined indicator comprises a version identifier indicating a version of at least the given state information part.

In some such embodiments, the one or more predetermined triggers include determining that the version identifier received from the target radio access node 104 does not correspond with a current version of the given state information part. Thus, in some embodiments, the UE 102 may use the version identifier received in the message from the target radio access node 104 to determine whether the target radio access node 104 has out-dated state information relating to the UE 102. If the version identifier received in the message does not correspond to the current version of the state information, the UE 102 provides the updated state information following the change in connection.

Some embodiments comprise including a version identifier indicating a version of the given state information part when reporting the value associated with the given state information part to the radio access network 101. Some embodiments comprise including a version identifier indicating a version of the given state information part when reporting a change in the value associated with the given state information part to the radio access network 101. Some such embodiments comprise advancing the version identifier indicating the version of the given state information part upon transmitting the change in the value associated with the given state information part to the radio access network 101. Some such embodiments comprise advancing the version identifier indicating the version of the given state information part upon reporting the change in the value associated with the given state information part to the radio access network 101.

Thus, in some embodiments, whenever the UE 102 provides state information, it includes a version identifier. In some cases, the UE 102 steps the version identifier whenever it transfers state information that is different from state information that was previously transmitted to the radio access network 101. The UE 102 may consider the state information to have been transferred successfully if one or more appropriate acknowledgements is received at lower layers. In certain cases, the UE 102 steps the version identifier whenever it transmits state information that is different from state information that was previously transmitted, regardless of whether the transmitted state information was known to be received successfully by the radio access network 101, since an acknowledgement might not be received even though the radio access network 101 had successfully received the state information.

For state information parts whose associated values changes frequently, late changes are not unlikely. A separate version identifier may be applied to such state information parts. In other cases in which late changes are unlikely, it may be sufficient to use one, common version identifier to cover some or all state information parts collectively. Thus, in some embodiments, the version identifier is a common version identifier that indicates a version of both the given state information part and at least one additional state information part. Thus, in some embodiments, a single version identifier (referred to herein as a "common version identifier") may be used to cover a plurality of separate state information parts.

Some such embodiments comprise including the common version identifier when reporting the value associated with the given state information part and/or the at least one additional state information part to the radio access network 101. Some such embodiments comprise including the common version identifier when reporting a change in the value associated with the given state information part and/or the at least one additional state information part to the radio access network 101. Some such embodiments comprise advancing the common version identifier upon transmitting the change in the value associated with the given state information part and/or the at least one additional state information part to the radio access network 101. Thus, in some embodiments, when using a common version identifier, the UE 102 steps the version identifier whenever it transfers a state information part that has a value that is different from the value associated with the state information part that was previously transmitted.

In some such embodiments, the one or more predetermined triggers include:
  determining that the common version identifier received from the target radio access node 104 does not correspond with a current common version of the given state information part and the at least one additional state information part; and determining that the value currently associated with the given state information part is different from the value associated with a version of the given state information part as indicated by the received common version identifier. Thus, in some embodiments, in the event that the common version identifier received in the message from the target radio access node 104 does not correspond with the version of the state information that the UE 102 has, the UE 102 provides updated state information including at least the values of the state information parts that changed compared to those in relation to the version identifier received in the message from the target radio access node 104.

In some embodiments, the message received from the target radio access node 104 relates to handover. In other embodiments, the message received from the target radio access node 104 relates to a connection re-establishment procedure. In some embodiments, the message received from the target radio access node relates to neither a handover command nor a connection re-establishment procedure. For example, the message may be a dedicated message from the target radio access node or may relate to one or more procedures other than handover or re-establishment.

In some embodiments described above, a version identifier is used to determine whether the last (successful) state information report in which the value associated with the given status element was reported was potentially too late for the source radio access node 103 to have transmitted it to the target radio access node 104. However, the network need not provide an indication that it received a previous value associated with the given state information part from another radio access node, such as the source radio access node 103. This as this can be indicated implicitly, for example by the absence of the version identifier or by the inclusion of a specific version identifier value. For example upon a change from a cell in which the UE 102 is not configured to report on the given state information part to a cell in which the UE 102 is configured to report on the given state information part, the UE 102 may (again) provide the updated value associated with the given state information part in the event that the target radio access node 104 indicates in a message that it transmits to the UE 102 that it does not have the updated value associated with the given state information part by not providing any version identifier, by means of a special or predefined version identifier value or by means of a separate indication, for example by using a separate indication for each state information part in the event that a common version identifier is used.

Thus, in some embodiments, the given state information part is associable with a version identifier that indicates a version of the given state information part and the at least one predetermined indicator includes a predetermined version identifier. In some embodiments, the given state information part is associable with a version identifier that indicates a version of the given state information part and the at least one predetermined indicator includes the absence of a version identifier associated with the given state information part.

In some embodiments, the one or more predetermined triggers include determining that the source radio access node 103, and/or one or more radio access nodes to which the UE 102 was previously connected since the value currently associated with the given state information part was reported to the radio access network 101, does not support forwarding of state information relating to the UE 102.

The indication that the target radio access node 104 does not have current state information may be provided in at least two different ways. One way in which the target radio access node 104 may indicate that it does not have the current state information is by indicating that it does not have any value associated with a particular state information part, for example using dedicated signalling. Another way in which it may be indicated that the target radio access node 104 does not have the current state information is for the radio access network 101 to indicate whether each cell or associated radio access node supports transparent transfer of state information relating to the user, for example by using broadcast signalling. In the latter case, the UE 102 assumes that target radio access node 104 does not have a current value associated with the given state information part if the UE 102 was connected to one or more cells that did not support transparent transfer of state information since it last provided an updated value associated with the given state information part to the radio access network 101.

Thus, the target radio access node 104 may indicate whether or not it has a value associated with the given state information part. The radio access network 101 may also, or alternatively, indicate for each cell whether or not the cell supports transparent transfer of state information relating to the UE 102. This may either be provided by using broadcast signalling, such as system information, or by using dedicated signalling as explained above. In the event of using dedicated signalling, the UE 102 assumes that the target radio access node 104 does not have a value associated with the given state information part if the UE 102 was connected to one or more cells that did not support transparent transfer of status info since it last provided a state information report for the one or more features associated with the given state information part. Some embodiments comprise transmitting the value currently associated with the given state information part to the target radio access node 104 in response to said detecting at least one predetermined trigger only if the given state information part is associated with one or more features for which state information reporting is configured in the second cell 106.

One consideration is what state information the UE 102 should include when repeating the state information reporting due to a late change. Different radio access nodes may configure state information reporting for different features, for example because the radio access nodes are provided by different vendors and do not support the same set of features. For example, in the first cell 105, the UE 102 may be configured to perform state information reporting for features A and B, while in the second cell 106 the UE 102 may be configured to perform state information reporting for features B and C. In embodiments described above, unnecessary repeating of state information reporting may be reduced for the features that are shared between the first cell 105 and the second cell 106, in this case feature B. Additionally, the UE 102 may provide a state information report for the features that are newly configured by the second cell 106; those that are not shared with first cell 105 ? in this case feature C. Furthermore, the UE 102 need not repeat state information reporting due to a late change in relation to a feature, such as feature A in the example above, that is not configured in the second cell 106. Thus, in some embodiments, the UE 102 may be configured to repeat updated state information following a handover or another change in connection only if the late change concerned one or more features that are configured in the second cell 106 (irrespective of whether or not they are also configured in the first cell 105).

In some embodiments, the one or more predetermined triggers include determining that the given state information part is associated with one or more features for which state information reporting is configured in the second cell 106 and for which state information reporting is not configured in the first cell 105. As such, whenever the UE 102 moves from a cell associated with a radio access node that does support state information reporting for a particular feature to a node supporting reporting of the particular feature, the UE 102 reports the current value associated with the given state information part. Thus, in some embodiments, following a change in connected mode from a first cell 105 in which the UE 102 is not configured to report (changes to) a particular state information part to a second cell 106 in which the UE 102 is configured to report (changes to) the particular state information part, the UE 102 initiates a state information report regardless of whether or not the value associated with the particular state information part has changed compared to what was included in a previously sent state information report identifying a previous value associated with the particular state information part.

In some embodiments, the given state information part is associated with one or more features for which state information reporting is configured in the second cell 106 and for which state information reporting is not configured in the first cell 105.

In other embodiments, the given state information part is associated with one or more features for which state information reporting is configured in both the first cell 105 and the second cell 106. Such embodiments reduce unnecessary state information reporting by the UE 102 following a cell change, for example handover or re-establishment, in connected mode between cells in which the UE 102 is configured to report changes or updated associated with the given state information in both cells.

State information reporting by the UE 102 may include several procedural aspects, at least some of which may be handled in a common manner, while other aspects may need to be handled separately in relation to some of the state information parts.

Some embodiments comprise transmitting an additional current value associated with a further given state information part to the target radio access node in response to detecting at least one of one or more predetermined triggers that indicate that the target radio access node may not have received the additional current value from the source radio access node and relying on the target radio access node having received the additional current value from the source radio access node if said at least one of said one or more predetermined triggers is not detected. In some embodiments, at least the current value and the additional current value are included in a single message to the target radio access node. Thus, in some cases, a common message or procedure is introduced for the common reporting of several different state information parts. Common procedural aspects are specified at the level of this common message. Nevertheless, it may still be desirable to have a procedural specification for the state information parts included in the common message. This may be achieved by treating the different state information parts as if they were separate messages, so that the common message would be considered as a list of individual messages.

Figure 2:
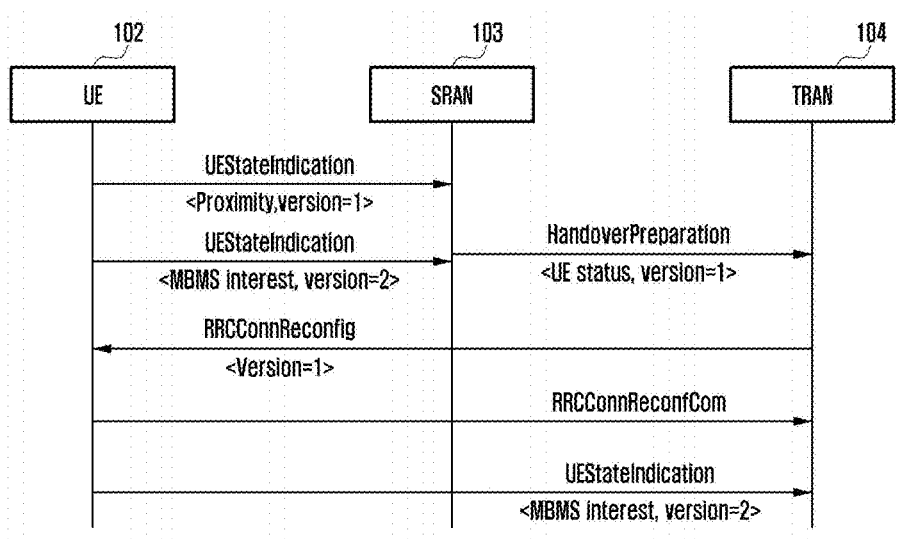
FIG. 2 shows a method of processing state information relating to user equipment according to some embodiments.

FIG. 2 shows a method of processing state information relating to user equipment according to some embodiments.

At least some embodiments described above may result in modifications to procedures and information specified in 3GPP TS 36.331, "Evolved Universal Terrestrial Radio Access (E-UTRA); Radio Resource Control (RRC); Protocol specification". Some modifications may include:

- using a common message (UEStateIndication) to report at least the current value associated with the given state information part, for example following detection of late changes during handover;
- extending the AS-Context field within the HandoverPreparation message to include at least the current value, possibly as well as a version identifier; and
- extending the RRCConnectionReconfiguration message, which is used to convey a handover command, to include the version identifier.

In some embodiments, the otherconfig field, within an RRCConnectionReconfiguration message may be used to indicate timing information. In some embodiments, a UEStateInformation message may serve as a common state information message that includes an indication of (one or more) current version(s) of the state information. The UEStateInformation message may include both one of more state information values, for example indicating MBMS interest, as well as one or more version identifiers. In some embodiments, a new field may be provided within the RRCConnectionReconfiguration message to indicate the version(s) of state information that is available in the E-UTRAN upon handover. In some embodiments, the MeasurementReport message that the UE sends to the E-UTRAN may also be modified.

Figure 3:
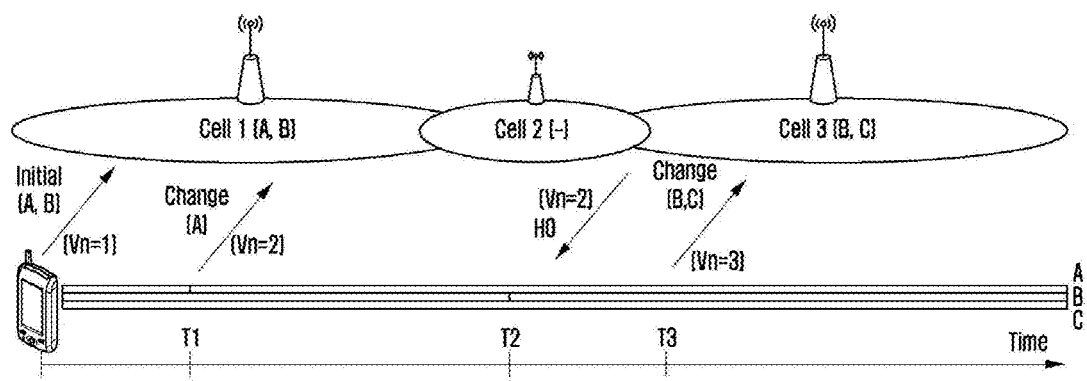
FIG. 3 shows a method of processing state information relating to user equipment according to some embodiments.

FIG. 3 shows a method of processing state information relating to user equipment in a communications system according to some embodiments. In these embodiments, a single, common version identifier is used to cover all of the state information parts making up the state information.

In this example, the state information relating to the user equipment comprises three different state information parts, denoted A, B and C and associated with features A, B and C respectively.

Three cells are depicted in which state information reporting is configured for different features. State information reporting for features A and B is configured in a first cell. State information reporting is not configured at all in a second cell. However, the second cell supports transparent forwarding of state information; in other words, although the second radio access node that controls the second cell does not comprehend state information that it receives from the first radio access node that controls the first cell, it forwards the state information to the third radio access node that controls the third cell. State information reporting for features B and C is configured in a third cell.

The UE 102 establishes an initial connection to the first radio access node, where it performs state information reporting for features A and B and includes a version identifier Vn=1 when reporting. At time T1, while the UE 102 is still in the first cell, the value of the state information part associated with feature A changes. The UE 102 transmits the updated value of the state information part associated with feature A to the first radio access node and steps the version identifier to Vn=2.

The UE 102 then moves, in connected mode, to the second cell. The first radio access node transmits the latest state information it has relating to the UE 102 to the second radio access node even though the second radio access node does not comprehend the state information.

At time T2, while the UE 102 is in the second cell, the value of the state information part associated with feature B changes. Since the reporting of changes associated with feature B is not configured in the second cell, the UE 102 does not report the changed value to the second radio access node and does not step the version identifier associated with the state information.

The UE 102 then moves, in connected mode, from the second cell to the third cell. The second radio access node transmits the latest state information it has relating to the UE 102 ? which is the state information it received from the first radio access node ? to the third radio access node. In this case, the second radio access node transparently transfers the state information to the third radio access node.

The UE receives a message from the third radio access node which includes the version identifier Vn=2. This corresponds to the version of the state information that was transparently forwarded by the second radio access node.

The UE 102 determines that the third cell supports reporting of features B and C. The UE 102 does not transmit the current value associated with feature A (which was changed at time T1) to the third radio access node since reporting of feature A is not configured in the third cell. The UE 102 determines that it has not transmitted the updated value associated with feature B (which was changed at time T2) to the radio access network. The UE 102 also determines that it has not transmitted the (current) value associated with feature C to the radio access network, since reporting of feature C was not configured in either the first or second cell. As such the UE 102 transmits, in a common message, the current value associated with feature B (which was updated at time T2) and the current value associated with feature C at time T3 while the UE 102 is connected to the third cell and updates the version identifier associated with the state information to Vn=3.

Figure 4:
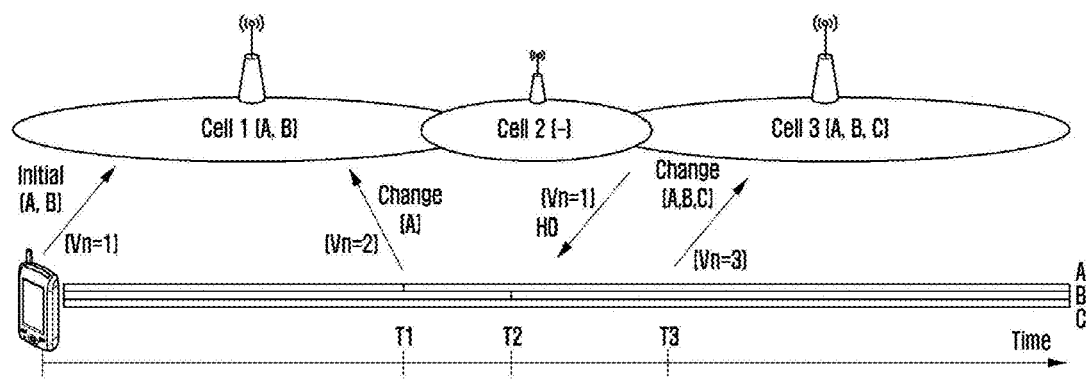
FIG. 4 shows a method of processing state information relating to user equipment according to some embodiments.

FIG. 4 shows a method of processing state information relating to UE 102 in a communications system according to some embodiments. In these embodiments, a single, common version identifier is used to cover all of the state information parts making up the state information.

The method shown in FIG. 4 is similar to that shown in FIG. 3. However, in this example, reporting of feature A, in addition to features B and C, is configured in the third cell.

In particular, the UE 102 establishes an initial connection to the first radio access node, where it performs state information reporting for features A and B and includes a version identifier Vn=1 when reporting. At time T1, while the UE 102 is still in the first cell, the value of the state information part associated with feature A changes. The UE 102 transmits the updated value of the state information part associated with feature A to the first radio access node and steps the version identifier to Vn=2. However, in this example, the UE 102 reports the changed value associated with feature A just prior to the UE 102 moving, in connected mode, to the second cell.

The first radio access node transmits the latest state information it has relating to the UE 102 to the second radio access node even though the second radio access node does not comprehend the state information. In this example, the first radio access node did not receive the updated state information from the UE 102 in time for it to be transmitted to the second radio access node. As such, the state information transmitted by the first radio access node to the second radio access node is the initially reported state information associated with the version identifier Vn=1.

At time T2, while the UE 102 is in the second cell, the value of the state information part associated with feature B changes. Since the reporting of changes associated with feature B is not configured in the second cell, the UE 102 does not report the changed value to the second radio access node and does not step the version identifier associated with the state information.

The UE 102 then moves, in connected mode, from the second cell to the third cell. The second radio access node transmits the latest state information it has relating to the UE 102—which is the state information it received from the first radio access node—to the third radio access node. In this case, the second radio access node transparently transfers the state information to the third radio access node. In this example, the transparently transferred state information include the version identifier Vn=1.

The UE 102 receives a message from the third radio access node which includes the version identifier Vn=1. This corresponds to the version of the state information that was transparently forwarded by the second radio access node.

The UE 102 determines that the third cell supports reporting of features A, B and C. The UE 102 determines that the third radio access node does not have the current value associated with feature A since the version identifier it received from the third radio access node (Vn=1) does not correspond with the current version of the state information (Vn=2). The UE 102 determines that the value associated with feature A changed between the first and second version and determines that the current value associated with feature A is to be transmitted to the third radio access node. The UE 102 determines that it has not transmitted the updated value associated with feature B (which was changed at time T2) to the radio access network. The UE 102 also determines that it has not transmitted the (current) value associated with feature C to the radio access network, since reporting of feature C was not configured in either the first or second cell. As such the UE 102 transmits, in a common message, the current value associated with feature A (which was updated at time T1), feature B (which was updated at time T2) and the current value associated with feature C at time T3 while the UE 102 is connected to the third cell and updates the version identifier associated with the state information to Vn=3.

Figure 5:
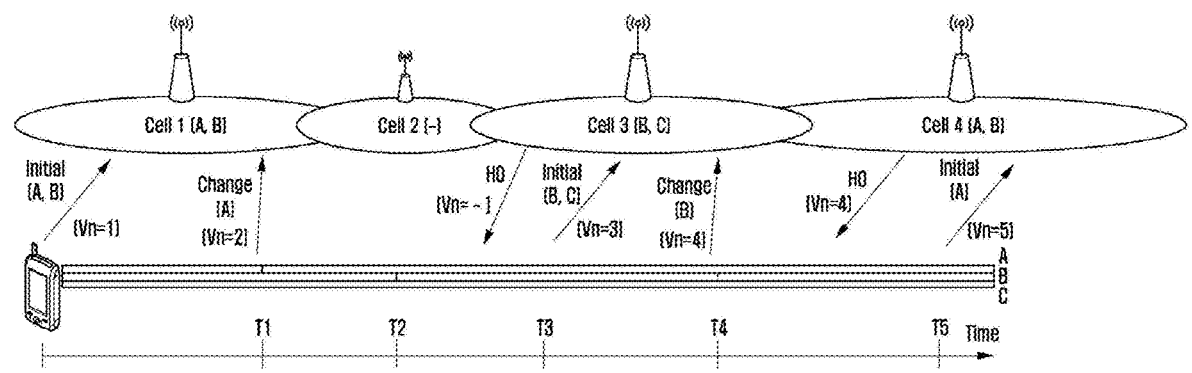
FIG. 5 shows a method of processing state information relating to user equipment according to some embodiments.

FIG. 5 shows a method of processing state information relating to user equipment in a communications system according to some embodiments. In these embodiments, a single, common version identifier is used to cover all of the state information parts making up the state information.

In this example, the state information relating to the user equipment comprises three different state information parts, denoted A, B and C and associated with features A, B and C respectively.

Four cells are depicted in which state information reporting is configured for different features. State information reporting for features A and B is configured in a first cell. State information reporting is not configured at all in a second cell. In this example, the second cell does not support transparent forwarding of state information. State information reporting for features B and C is configured in a third cell. State information reporting for features A and B is configured in a fourth cell.

The UE 102 establishes an initial connection to a first radio access node that controls the first cell, where it performs state information reporting for features A and B and includes a version identifier Vn=1 when reporting. At time T1, while the UE 102 is still in the first cell, the value of the state information part associated with feature A changes. The UE 102 transmits the updated value of the state information part associated with feature A to the first radio access node and steps the version identifier to Vn=2.

The UE 102 then moves to the second cell. However, since the second radio access node that controls the second cell does not support transparent forwarding of state information, the second radio access node does not receive state information from the first radio access node.

At time T2, while the UE 102 is in the second cell, the value of the state information part associated with feature B changes. Since the reporting of changes associated with feature B is not configured in the second cell, the UE 102 does not report the changed value to the second radio access node and does not step the version identifier associated with the state information.

The UE 102 then moves the second cell to the third cell. Since the second radio access node does not support transparent forwarding of state information, the third radio access node does not receive the state information from the second radio access node.

The UE 102 receives a message from the third radio access node which includes a predetermined indicator from which the UE 102 can determine that the third radio access node does not have current state information. For example, the third radio access node may include no version identifier or a special parameter in a message to the UE 102.

The UE 102 determines that the third cell supports reporting of features B and C. The UE 102 does not transmit the current value associated with feature A (which was changed at time T1) to the third radio access node since reporting of feature A is not configured in the third cell. The UE 102 determines that it has not transmitted the updated value associated with feature B (which was changed at time T2) to the radio access network. The UE 102 also determines that it has not transmitted the (current) value associated with feature C to the radio access network. As such the UE 102 transmits, in a common message, the current value associated with feature B (which was updated at time T2) and the current value associated with feature C at time T3 while the UE 102 is connected to the third cell and updates the version identifier associated with the state information to Vn=3.

At time T4, while the UE 102 is in the third cell, the value of the state information part associated with feature B changes. Since the reporting of changes associated with feature B is configured in the third cell, the UE 102 reports the changed value to the third radio access node and step the version identifier associated with the state information to Vn=4.

The UE 102 then moves, in connected mode, from the third cell to the fourth cell. The third radio access node transmits the latest state information it has relating to the UE 102 to the fourth radio access node and includes the version identifier Vn=4.

The UE receives a message from the fourth radio access node which includes the version identifier Vn=4.

The UE 102 determines that the fourth cell supports reporting of features A and B. However, the UE 102 remembers determining that the second cell did not support transparent transfer of state information and that the fourth radio access node will not have the current value associated with feature A since reporting of feature A was not configured in the third cell. As such, the UE 102 determines that it will need to transmit the current value associated with feature A to the fourth radio access node. The UE 104 compares the version identifier it received from the fourth radio access node, Vn=4, to the current version identifier, Vn=4, and determines that the fourth radio access node has the current value associated with feature B. As such, the UE 104 determines that it need not transmit the current value associated with feature B to the fourth radio access node.

Accordingly, at T5 the UE 102 transmits the current value associated with feature A to the fourth radio access node and updates the version identifier associated with the state information to Vn=5.

In some embodiments described above, the target radio access node 104 controlling the second cell 106 does not have up to date state information as a result of a change in connection from the source radio access node 103 to the target radio access node 104. However, at least some of the procedures described above, in particular relating to determining when the UE 102 should provide a new state information report, may also apply when the UE 102 moves from one cell to another cell, even if both cells are controlled by the same radio access node. In such cases, the UE may be configured to determine whether there is a need to provide a new state information report.

Figure 6:
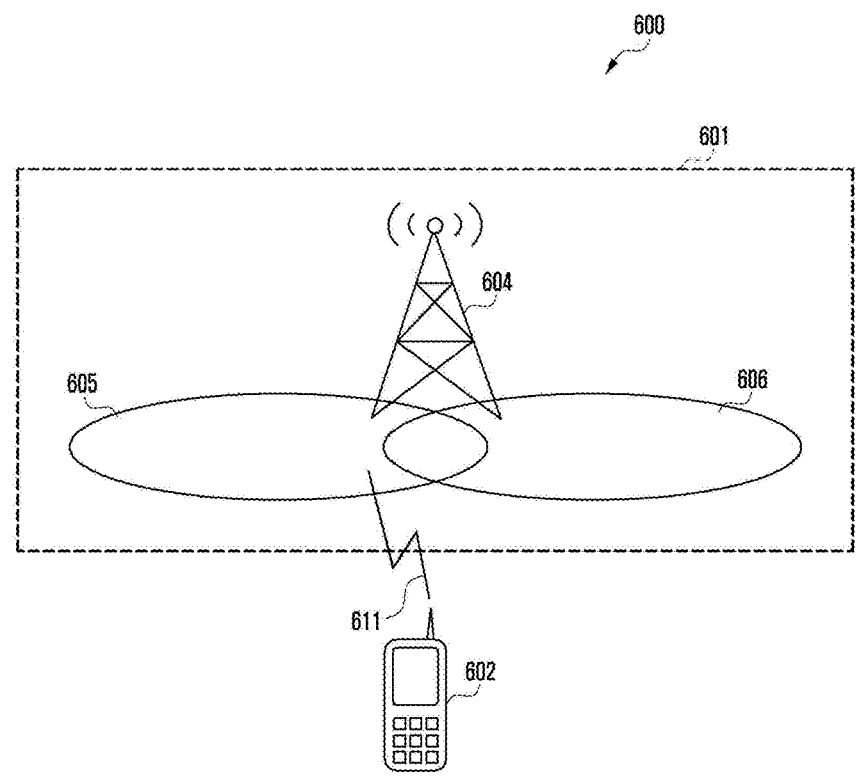
FIG. 6 is a block schematic representation of a communications system according to some embodiments.

FIG. 6 is a block schematic representation of a communications system 600 according to some embodiments. The communications system 600 depicted in FIG. 6 includes some elements that are the same as, or are similar to, elements shown in FIG. 1. Such elements are given the same reference numerals as used above in relation to FIG. 1 but are incremented by five hundred.

The communication system 600 depicted in FIG. 6 includes a radio access network 601, which includes a radio access node 604. The radio access node 604 controls first and second cells 605, 606. UE 602 can communicate with the radio access node 604 via a radio interface 611.

Some embodiments provide a method of processing state information relating to user equipment in a communications system 600 comprising a radio access network 601. The communications system 600 comprises a first cell 605 and a second cell 606. In some embodiments, the first cell 605 and the second cell 606 are controlled by the same radio access node 604. The method comprises maintaining current state information relating to the user equipment 602. The state information comprises at least one state information part associated with one or more features for which state information reporting may be configured in the first cell 605 and/or the second cell 606. The at least one state information part is associable with a plurality of different values. The UE 602 is configured to detect a connection change to the second cell. The UE is configured to transmit a current value associated with a given state information part to a radio access node 604 associated with the second cell 606 in response to detecting at least one of one or more predetermined triggers that indicate that the radio access node 604 associated with the second cell 606 may not have the current value. The UE 602 is configured to rely on the radio access node 604 associated with the second cell 606 having the current value if said at least one of said one or more predetermined triggers is not detected.

Some embodiments provide a method of processing state information relating to user equipment in a communications system 600 comprising a radio access network 601. The communications system 600 comprises at least one cell 605, 606 that is controlled by the radio access node 604. The method comprises maintaining current state information relating to the user equipment 602. The state information comprises at least one state information part associated with one or more features for which state information reporting may be configured in the at least one cell 605, 606. The at least one state information part is associable with a plurality of different values. The UE 602 is configured to detect a connection change in relation to the at least one cell 605, 606. The UE is configured to transmit a current value associated with a given state information part to a radio access node 604 associated with the at least one cell 605, 606 in response to detecting at least one of one or more predetermined triggers that indicate that the radio access node 604 associated with the at least one cell 605, 606 may not have the current value. The UE 602 is configured to rely on the radio access node 604 associated with the second cell 606 having the current value if said at least one of said one or more predetermined triggers is not detected. In such embodiments, the UE 602 may perform such processing even where there is no change of cell, for example in the case of re-establishing a connection to the radio access node 604 following detecting of a failure therewith.

At least some embodiments described above reduce the need for the UE 102, 602 to repeat state information reporting after every cell change in connected mode, for example as part of a handover or connection re-establishment procedure. In some embodiments, a source RAN node, such as a source eNb, forwards UE state information to a target RAN node, such as a target eNb. In some embodiments, following a cell change in connected mode from a cell in which the reporting of UE state information is not configured to a cell in which the reporting of UE state information is configured, the UE 102, 106 always provides updated state information. In some embodiments, following a cell change in connected mode between cells in which the reporting of UE state information is configured, the UE 102 provides updated state information if: at least part of the state information changed shortly before the cell change and/or if a 'version' received from the target radio access node 104 indicates that the target radio access node 104 does not have up-to-date UE state information. In some such embodiments, a version can be exchanged on the basis of individual state information parts or a common version can be used to cover a plurality of state information parts. In some embodiments, a common message or procedure may be used to specify the elements (information as well as procedural aspects) that are common for all state information parts only once. At least some embodiments provide mechanisms to limit repeated state information reporting by the UE 102, 602 after every cell change in connected mode. Some embodiments seek to minimise the repetition, by transferring state information from a source node to a target node, complemented with the UE 102, 602 providing one or more state information reports in the event that the state information may have changed after the source node transferred the state information to the target node.

The above described embodiments of the invention relate to a general approach for transferring UE state information to a target node, and specifically relate to minimising repetitive transmission of state information from the UE by transferring state information from a source node, where possible. UE state information is retransmitted in the event that a predetermined trigger is received (each predetermined trigger providing an indication that the state information may not have been received by the target node). There will now be described further specific embodiments of the invention in which the general approach is applied to a specific situation in which advantageously the amount of state information from a UE to a target node is to be minimised.

In accordance with certain embodiments of the invention the general approach above can be applied to signalling concerning UE indications of In Device Co-existence (IDC) interference. An IDC indication including IDC state information is generated when it is identified that a particular frequency or group of frequencies that might otherwise be used for communicating with a RAN is unavailable due to interference at the UE by co-located wireless transmission equipment. Additionally, an IDC indication may also be generated in the event that RAN/LTE transmission introduces interference problems for the co-located wireless transmission equipment, or other technologies implemented within or connection with the UE. Additionally, as well as being generated at the start of interference, an IDC indication may also be generated at the end of interference, or in the case of temporal periodically occurring problems. As used herein, "IDC indication" refers to a transmitted message sent to the network reporting IDC interference. An IDC indication may alternatively be referred to as an IDC signal, IDC indication signal, IDC message or an IDC indication message. The IDC state information comprises at least part of the information content of an IDC indication. IDC state information may comprise an indication that an IDC interference problem is occurring. IDC state information may comprise a flag indicating an IDC problem for a specified frequency. The specific characteristic of state information as used in the present specification, including IDC state information, is that the UE notifies E-UTRAN about the change of state information. Whether a frequency has IDC problems is state information. Additional information may also be generated, as will be discussed in greater detail below. Additional information may be transmitted within an IDC indication, or separately. The additional information may include identifying alternative cells, including a best cell for a non-interfered handover candidate frequency and a current measurement result for such a cell. The additional information is non-state information.

Certain embodiments of the invention relating to IDC signalling are particularly applicable to the forthcoming release 11 (REL-11, and anticipated future releases) of the Evolved Universal Terrestrial Radio Access (E-UTRA) and the Evolved Universal Terrestrial Radio Access Network (E-UTRAN) protocol, referred to hereinafter as the REL-11 standards or REL-11 of 3GPP TS 36.331. Specifically, embodiments of the invention affect the procedures and information specified in 3GPP TS 36.331, Evolved Universal Terrestrial Radio Access (E-UTRA); Radio Resource Control (RRC); Protocol specification. However, it will be appreciated that embodiments of the present invention are not limited to this particular application, and may be applicable to other systems, and in particular other radio access networks where there is a similar need to provide and disseminate IDC state information.

In common with the general approach to the provision of state information to a target node described above, embodiments of the invention relating to IDC interference signalling to be described below may optionally implement one or more of a group of mechanisms for avoiding the need for the UE to repeat IDC state information reporting after every cell change in connected mode (that is, as a result of handover or connection re-establishment). Where the following description refers to handover, it should be considered that where appropriate this is also applicable to connection re-establishment.

Implementation details of IDC interference signalling within REL-11 standards are still to be finalised. In particular, implementation details of signalling aspects related to an indication of in-device coexistence problems provided by the UE to the E-UTRAN, including the dissemination of IDC state information, are still to be finalised. It is anticipated that the REL-11 standards may establish guidance that the UE should send an IDC indication to the network to report an IDC problem detected at the UE. The REL-11 standards may stipulate that existing LTE measurements and/or UE internal coordination should be used as a baseline to trigger an IDC indication. How an indication is triggered may be left open any so may vary between different UE implementations. The REL-11 standards are expected to specify that the UE is allowed to provide indications for specific frequencies only.

The REL-11 standards are expected to leave it to network implementation how to act upon receiving an IDC indication signal provided by the UE. In some cases it may be appropriate to apply a Frequency Division Multiplexing (FDM) solution. An FDM solution may be to initiate handover to a new cell operating a new frequency. An alternative FDM solution may be to not schedule certain frequency resources to the UE. In other cases the transmissions of the interfering systems may be accommodated through a Time Division Multiplexing (TDM) solution. Embodiments of the present invention focus on the LTE specifications, and thus focus on limiting LTE transmissions. In accordance with certain embodiments of the present invention, the UE may provide additional information, within the IDC indication, or separately, to assist the network when responding to the IDC indication. Such information can be considered to be non-state information. The details regarding possible FDM or TDM solutions to IDC interference implemented by a network fall outside the scope of the present invention, which relates specifically to the provision of IDC interference indications, including IDC state information to a network node, and so will not be described further. IDC indication signal may be conveyed in a new UL-DCCH Message (i.e. RRC signalling). Alternatively, or in addition, a general message may be used to host also other sate information, for instance MBMSInterestIndication). The IDC indication signal can also be reused to send updated assistant information, including the case that there is no longer an IDC problem.

As described above in the general approach relating to transmission of state information between a source RAN and a target RAN, in accordance with embodiments of the present invention in the event of inter-eNB handover, IDC state information is transferred from the source to the target eNB. This reduces repetitive transmission of state information from a UE. In accordance with a further embodiment of the invention, transmission of repetitive state information comprising IDC interference assistant information may be reduced by implementing a prohibition mechanism specifying a minimum interval between successive IDC indications form a UE.

Figure 7:
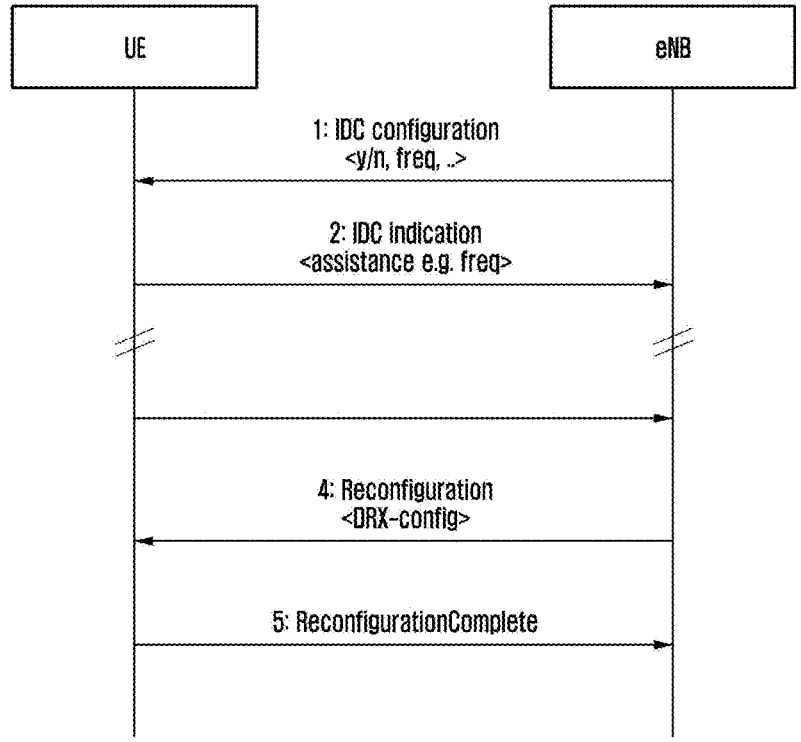
FIG. 7 shows a conventional method of processing state information relating to an In Device Co-existence (IDC) indication through reconfiguration (Time Domain Multiplexing TDM)

Referring now to FIG. 7 there is illustrated the basic message sequence for the case in which the eNB employs a TDM solution that is expected to form part of the REL-11 standards. At step 1 the network transmits an IDC configuration message to a UE. Note it is still to be confirmed whether the network configures the UE to provide IDC indications, and also for which frequencies the UE may trigger such an indication. In response to detecting IDC interference the UE is arranged to transmit an IDC indication message to the network at step 2. The IDC indication is provided by a new message, which may additionally be used for other indications. The UE includes assistance information that may cover both FDM and TDM solutions, the details of which are still to be confirmed. Upon sending the IDC indication, the UE starts a prohibition timer. The prohibition timer implements a prohibit mechanism used to restrict the interval at which the UE may send IDC indications. At step 3 (the unlabelled arrow), in the event that the IDC indication conveyed in the previously signalled IDC indication changes, the UE is arranged to provide an update. In case the change occurs while the prohibit timer is still running, the UE delays sending the IDC indication until the timer expires. At step 4, in response to the IDC indication message of step 2 (or the revised IDC indication message of step 3), and depending upon the contents of the IDC indication message, the eNB may perform a network reconfiguration to seek to address the IDC interference. The network reconfiguration may be to modify the DRX configuration in a TDM solution. At step 5 the UE is arranged to send a reconfiguration complete message to the eNB.

Figure 8:
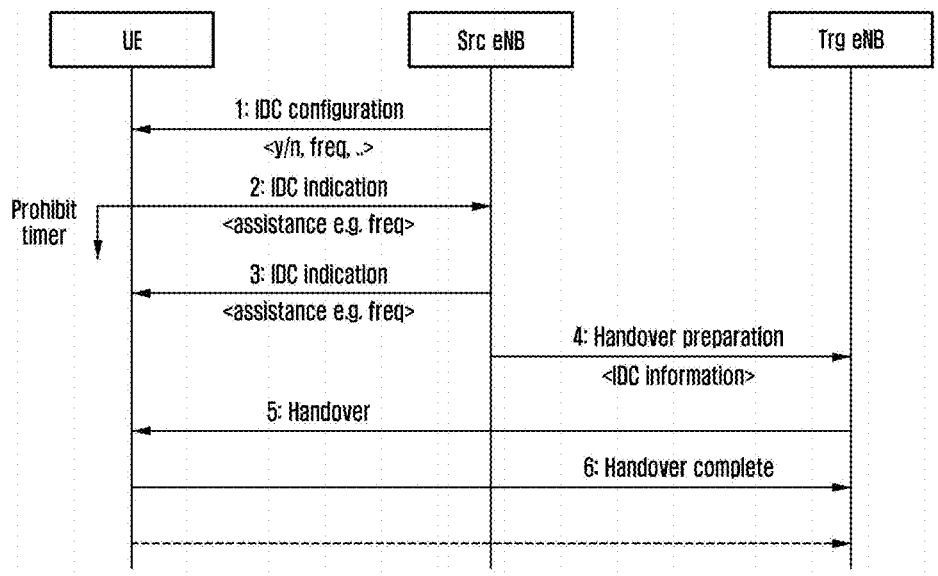
FIG. 8 shows a conventional method of processing state information relating to an IDC indication through handover to a new cell (Frequency Division Multiplexing FDM)

Referring now to FIG. 8 there is illustrated the basic message sequence for the case the eNB employs an FDM solution. Steps 1 to 3 are the same as described above in connection with FIG. 7, though it will be appreciated that the message configuration might be slightly different for FDM and TDM solutions. The configuration in step 1 may be different, and/or the contents of the IDC indication in step 2 may be different. For example the precise assistant IDC state information to be provided by the UE in the IDC indication message may vary. At step 4, and depending upon the contents of the IDC indication, the eNB may perform a handover to move the UE to another frequency in an FDM solution. The source eNB initiates the handover by sending a handover preparation to the target eNB which contains IDC information reported by the UE at step 4. Handover is signalled by means of a reconfiguration message including a specific field (the mobilityControlInformation) At step 5 the target eNB compiles the handover message to be sent to the UE, taking into account the IDC information received. For instance the target eNB may not configure SCells on frequencies reported as problematic in the IDC information. Either as part of the handover or subsequently, the target eNB may modify the IDC configuration by sending a new IDC configuration message to the UE as described above at step 1. At step 6 upon successfully completing the handover, the UE sends a complete message to the target eNB.

As will be appreciated from the above discussion of proposals for implementing IDC interference indication signalling in the REL-11 standards there are a number of areas of IDC signalling that have not been addressed in current proposals. Certain embodiments of the present invention address one or more of the following areas:

1. Determining which frequencies the UE should report an IDC interference problem, including whether this is configured by the eNB.

2. The circumstances in which the UE should re-transmit an IDC indication, including IDC state information, even though the contents of the IDC indication have not changed. In particular, whether retransmission is necessary upon the UE connecting to a new cell, or if the IDC configuration within a cell changes. It is currently undefined the circumstances in which the UE should assume that an E-UTRAN has lost IDC information the UE previously signalled to the network 3. Measurement information. In the REL-11 standards proposals it is currently unclear what additional information, beyond the IDC state information, the UE may provide to assist the network to handle the IDC interference. For instance, in accordance with certain embodiments of the invention in case of handover to another frequency (FDM) it may be beneficial for the UE to provide additional information in the form of measurement information. The details of what additional information the UE should provide, as well as the signalling details including the associated configuration options, are undefined.

Referring firstly to the first area (determining for which frequencies the UE should report IDC interference problems, including whether this is configured by the eNB) it desirable to avoid introducing new signalling in the E-UTRAN standard. Consequently, certain embodiments of the present invention re-use existing E-UTRAN signalling. For instance in certain embodiments an RRC_Connected signal may be re-used (conventionally used by an E-UTRAN to control the measurement reporting of a UE). Alternatively, an RRC_IDLE message may be re-used (conventionally used by an E-UTRAN to control cell re-selection by a UE). In the event of a reconfiguration event an RRM measurement configuration message may be used to configure the frequencies for which IDC indications are required.

In accordance with an embodiment of the present invention a measurement configuration message is re-used to control the frequencies for which the UE should report IDC problems. A measurement configuration consists of a number of measurement objects and reporting configurations as well as measurement identities, which are used to link the two. The measurement objects and reporting configurations are configured within the UE for purposes other than for monitoring IDC interference. An IDC configuration message may be sent indicating which measurement objects are to be used to determine frequencies for the UE to monitor for IDC interference. Each measurement identity refers to a measurement that the UE performs. There may be measurement objects that are not linked by a measurement identity to a reporting configuration, in which case the UE does not perform measurements on the concerned frequency. There may be only one measurement object per frequency. There may be multiple measurement objects for the same frequency, linked by multiple measurement identities to different reporting configurations (for instance different conditions for triggering a measurement report). A measurement object within the UE may indicate one or more carrier frequency that the UE is arranged to provide measurements, for instance of received signal strength for a particular frequency, (and may also provide a list of cells for which specific parameters apply, for instance the availability of that frequency). The reporting configuration within the UE provides configuration parameters related to the triggering of measurement reports.

Conventionally, the UE only performs measurements on frequencies for which the associated measurement object is linked to a reporting configuration. Measurement objects that are not linked to a reporting configuration may be referred to as 'hanging' measurement objects. Conventionally, such hanging measurement objects are not configured or reported. It is anticipated that the REL-11 standards will leave it completely up to E-UTRAN implementation which objects a network configures. Conventionally there is no benefit in configuring a 'hanging object', except potentially to reduce signalling (for instance the signalling which would otherwise be needed to release a measurement object not linked to a reporting configuration, and later add the reporting configuration again when the measurement object becomes relevant again). The measurements described in the previous relating to measurement objects and reporting configurations) are usually referred to as Radio Resource Management (RRM) measurements. Other measurements may be performed by the UE or the network for the scheduling.

In accordance with certain embodiments of the present invention the RRM measurement results may be included as additional information in an IDC indication sent to the eNB. However, conventionally the UE does not perform measurements on frequencies for which the associated measurement object is not linked to a reporting configuration. Consequently it is expected that the default position in the REL-11 standards will be that a UE will report IDC interference problems only for carrier frequencies which the UE is configured to measure (that is, the associated measurement object is linked to a reporting configuration).

In some cases the network may not require the UE to provide measurement information to assist handover to another frequency, for instance for overlapping cells. Such cases are also referred to as blind handovers (i.e. not assisted by measurement information). In accordance with certain embodiments of the invention, the inventors have realised that for frequencies to which it is possible to perform blind handovers it may still be beneficial to receive IDC state information concerning the risk of IDC interference on that new frequency. This may be achieved using existing signalling by requiring the UE to provide IDC indications also for 'hanging' measurement objects. Using regular measurements even for hanging measurement objects has the drawback that the UE has to perform RRM measurements that may drain UE battery and/or reduce measurement performance. Consequently, in accordance with an embodiment of the present invention the UE is arranged to report IDC interference problems through one or more IDC indication for some or all of the carrier frequencies specified in the measurement configuration of the UE by a measurement object, regardless of whether or not the measurement object is linked to a reporting configuration (that is, whether or not the measurement object is hanging). Advantageously, no additional signalling need be specified for configuring frequencies for which the UE should provide an IDC report.

Referring now to the second area in which the published proposals for implementing IDC interference indication signalling in the REL-11 standards are undecided (determining when the UE should re-transmit an IDC indication), certain embodiments of the present invention identify in which cases should the UE assume that E-UTRAN has lost IDC state information the UE previously signalled to the network. Similarly to the general approach discussed above, certain embodiments of the present invention reduce repetitive transmission of state information relating to IDC interference indications. Current proposals for the REL-11 standards do not clearly specify how and when IDC state information relating to IDC interference problems should be retransmitted. However, it is expected that IDC state information should be transferred from a source eNB to target eNB.

Figure 9:
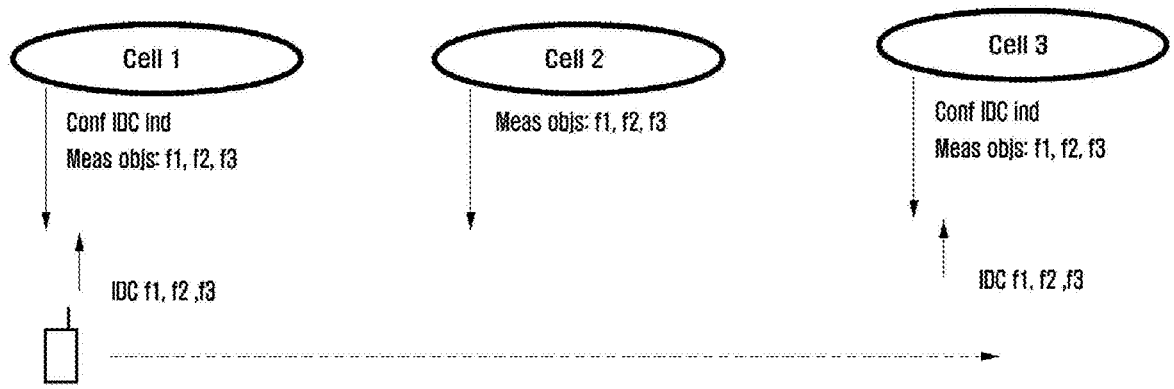
FIG. 9 shows a method of processing state information relating to an IDC indication for user equipment according to some embodiments.
Figure 10:
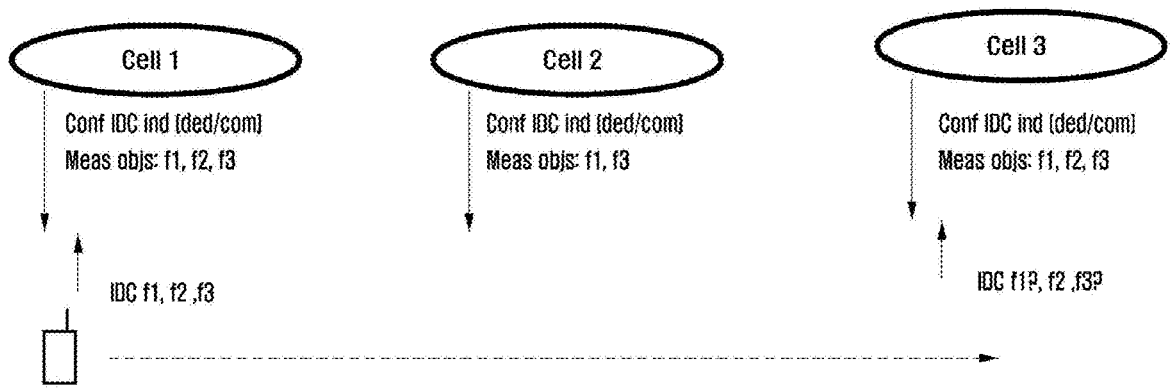
FIG. 10 shows a method of processing state information relating to an IDC indication for user equipment according to some embodiments.
Figure 11:
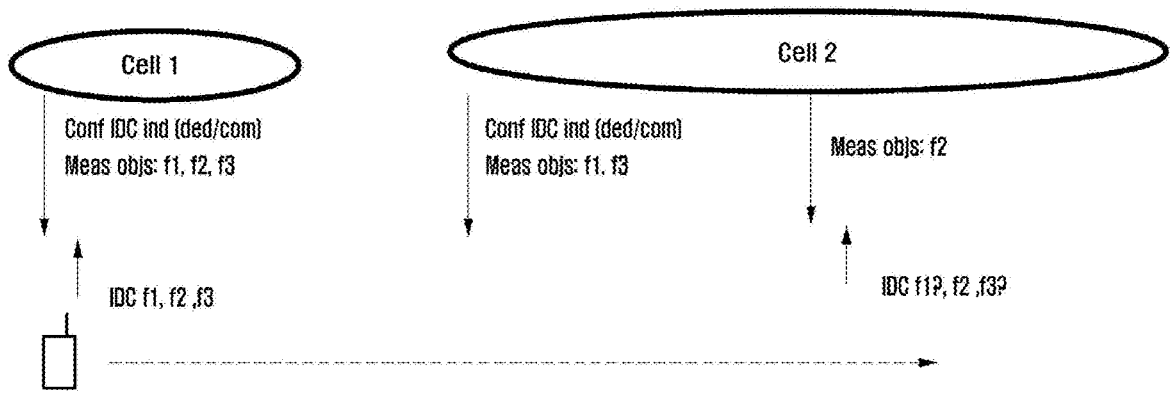
FIG. 11 shows a method of processing state information relating to an IDC indication for user equipment according to some embodiments.

Referring now to FIG. 9, this illustrates a first case in which a UE moves through a network including at least one cell controlled by an eNB that does not support IDC indications, and one or more other cells controlled by eNBs that do support IDC indications. It will be appreciated that FIG. 9 is similar in certain respects to the general approach of FIGS. 3 to 5 above for providing state information to eNBs during cell handover. Specifically, FIG. 9 illustrates the case in which the UE is configured to provide IDC indications in cell 1 and cell 3 but not in cell 2. FIG. 9 shows that the UE is configured with measurement objects for frequencies f1, f2 and f3 in all three cells. However, only in cells 1 and 3 is the UE configured with the measurement objects linked to corresponding reporting configurations. The E-UTRAN configures the UE to provide IDC indications for specified frequencies using a 'Conf IDC ind' signal as shown in connection with cells 1 and 3 (which specifies a reporting configuration for all 3 frequencies. The 'Conf IDC ind' signal is unlikely to be transmitted as a separate message, so more generally it can be considered that FIG. 9 shows the eNB configuring the UE to provide IDC indications by means of a configuration parameter. It will be appreciated that FIGS. 9 to 11 illustrate only one possible embodiment of the invention, in particular relating to the precise details of the configuration signalling. The UE is arranged to send an IDC indication to cell 1 including IDC state information for frequencies f1, f2 and f3 (assuming the UE connects first to cell 1 or the UE is otherwise aware that the network does not hold this IDC state information). It is assumed that the eNB controlling cell 2 does not support the transfer of the IDC information either from cell 1 or to cell 3. Consequently, the UE retransmits an IDC indication to cell 3 including IDC state information for f1, f2 and f3 when moving from cell 1 via cell 2 to cell 3, as the IDC information it previously sent to cell 1 is not available to the eNB controlling cell 3. If the UE moves between two cells in which the same IDC configuration applies then there is no need for the UE to retransmit the same IDC state information.

Referring now to FIG. 10, this illustrates a second case in which the UE moves through a network in which each cell is controlled by an eNB that supports IDC indications, but the frequencies specified for each cell are not the same. The eNBs controlling cells 1 and 3 configure the UE specifying measurement objects and reporting configurations for frequencies f1, f2 and f3. However, the eNB controlling cell 2 configures the UE specifying measurement objects and reporting configurations for frequencies f1 and f3 only. That is, the UE is configured to measure frequency f2 in cell 1 and cell 3 but not in cell 2 (for instance, because in the area surrounding cell 2 the frequency 2 is not deployed, or measurement assistance is not required). That is, in FIG. 10, in some cells the UE is configured to provide IDC indications for fewer frequencies.

The UE is arranged to send an IDC indication to cell 1 including measurements for f1, f2 and f3. When the UE connects to cell 2 there is no need for the UE to retransmit an IDC indication as discussed above in connection with FIG. 9 if the IDC state information has not changed.

Upon connecting to cell 3 the UE must determine whether to transmit IDC state information for f1, f2 and f3 (assuming that there have been no recent changes to the IDC state information which must be reported automatically). It is assumed that because the UE is configured to provide IDC indications for frequencies f1, and f3 when connected to cell 2, upon connecting to cell 3 IDC state information relating to frequencies f1 and f3 will be provided to the eNB controlling cell 3. However, the IDC state information held by the network for frequency f2 (which may or may not be provided to cell 3) will not reflect any IDC changes which the UE may have observed while connected to cell 2. That is, there is a risk that the IDC state information held by the network for frequency f2 may be out of date. Consequently, the UE may need to retransmit the IDC indication relating to frequency f2 upon moving to cell 3 in which the UE is again configured to report IDC indications.

In certain embodiments of the invention, IDC state information relating to frequency f2 is only transmitted to cell 3 if the IDC information has changed relative to the IDC state information for frequency f2 previously transmitted to cell 1 from the UE. This advantageously avoids retransmission of IDC state information correctly held by the network.

However, in an alternative embodiment of the present invention, in order to avoid potentially passing obsolete information between network nodes, cell 2 is only arranged to transmit IDC state information relating to frequencies f1 and f3 to cell 3 (that is, a cell only transmits IDC state information for frequencies for which a UE connected to that cell is configured to provide IDC indications). That is, in this alternative embodiment of the present invention an UE considers that the IDC state information for a frequency that was provided prior to handover to a new cell to be cleared (and so must be retransmitted) when after the handover the UE is not configured to measure and report the concerned frequency (i.e. the UE is not configured with a corresponding measurement object that is linked to a reporting configuration). In a further alternative embodiment an UE considers that the IDC state information for a frequency that was provided prior to handover to a new cell to be cleared (and so must be retransmitted) when after the handover the UE is not configured to measure the concerned frequency regardless of whether a measurement object for a frequency is linked to a reporting configuration. That is, in the latter further alternative embodiment, the UE also considers that IDC state information is cleared in those circumstances for hanging measurement objects. This may be generalised in certain embodiments as being that the UE is configured to consider IDC state information cleared by the network in those circumstances for frequencies for which the UE is configured to report IDC problems. Considering IDC state information to be cleared in those circumstances may be preferable in networks in which it is uncommon for adjacent cells to be configured for different frequencies, and so in such a network it is acceptable for a UE to always retransmit IDC state information when connecting to a new cell for frequencies for which the previous cell was not configured to measure and optionally report IDC problems.

Referring now to FIG. 11, this illustrates a third case, similar to the second case, in which a UE moves through a network in which the set of frequencies deployed are not the same everywhere, and may not correspond with cell boundaries (handover regions). In the third case the measurement configuration of a UE may change even though the UE is not moving between cells. In FIG. 11 in some cells and some areas of cells (or periods of time within a single cell) the UE is configured to measure fewer frequencies. In FIG. 11 cell 1 configures the UE specifying measurement objects and reporting configurations for frequencies f1, f2 and f3. The UE is arranged to send an IDC indication to cell 1 including measurements for f1, f2 and f3 including IDC state information. In a first part of cell 2, cell 2 sends an IDC indication configuration signal to the UE specifying measurement objects and reporting configurations for frequencies f1 and f3. In a second part of cell 2, cell 2 sends an IDC indication configuration message to the UE specifying a measurement object and a reporting configuration for frequency f2 only. In a further embodiment of the present invention a UE considers that the IDC information for a frequency that was previously provided to the network to be cleared (and so must be retransmitted) when the UE is no longer configured to measure the concerned frequency. Alternatively, the IDC state information may be considered to be cleared when the UE is no longer configured to measure and report IDC problems for a concerned frequency.

Referring now to the third area in which the published proposals for implementing IDC interference indication signalling in the REL-11 standards are undecided (determining what measurement information the UE should provide, how this is signalled and which configuration options are needed). In accordance with certain embodiments of the invention, beneficially the UE provides measurement information in the form of additional information for the new frequency either within an IDC indication or separately. The additional information may include IDC indications for frequencies other than the frequency for which a change in IDC interference has given rise to the original IDC indication.

When a serving frequency is affected by in-device coexistence problems, an E-UTRAN may choose to move the UE to another frequency. In accordance with certain embodiments of the present invention, to assist the network with selecting one or more target serving cell the UE provides measurement information concerning candidate frequencies that are not affected by the IDC. In particular embodiments this measurement information is transmitted to the network together with the IDC indication which triggers the handover. Advantageously this allows the network to immediately take a handover decision. Specifically, in accordance with certain embodiments of the present invention the UE includes an identification of one or more best cell for each candidate frequency which is not affected by the interference, where measurements are available. The one or more best cell may comprise cells for which the received signal strength for the frequency not affected by IDC interference is highest or exceeds a predetermined level. Alternatively, the best cell or cells may be judged in some other way. It will be appreciated by the appropriately skilled person that in case of IDC an E-UTRAN may initiate handover to a cell only to avoid the IDC problem. Consequently, such a handover candidate cell would not have triggered the measurement event criteria used for normal mobility, and so other than in accordance with this embodiment of the present invention reporting of such a cell would not be triggered based on normal mobility measurement criteria. Advantageously, this embodiment of the present invention is simple, in so far as it requires no further configuration of the UE or the network. Additionally, the measurement information for the best handover candidate cells for the selected new frequency are automatically provided without requiring a further processing step. Additionally, the inclusion of measurement information is included for cells that are appropriate for handover but may not have met any of the configured measurement event criteria, i.e. the UE may normally only report cells that are better than the current serving cell. Furthermore, the IDC indication may include best cell reporting for hanging measurement objects. It will be appreciated that in certain embodiments additional measurements may be required if measurements are not available for frequencies which the UE is not otherwise required to measure, though this may be undesirable and so not implemented in other embodiments for which the UE only provides already available measurement information. In certain exceptional cases, for instance following connection establishment, having measurement information available from idle mode, such measurement may already be available to the UE. In a further embodiment, the UE may be arranged to include the measurement information only in a situation in which the IDC indication is likely to trigger the E-UTRAN to initiate handover. In a further embodiment, the UE may be arranged to include IDC state information for all frequencies for which it is configured to maintain IDC state information when sending an IDC indication of an IDC interference problem in respect of a specific frequency, rather than just the IDC state information for that specific frequency.

The above embodiments are to be understood as illustrative examples of the invention. Further embodiments of the invention are envisaged.

In the above embodiments, the version identifier may be a version number. Other types of version identifier such as letters or other symbols or parameters are envisaged. Furthermore, although embodiments above refer to a 'value' associated with a state information part, it will be appreciated that the value need not be numeric and may depend upon possible states of one or more features with which the state information part may be configured.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method by a terminal in a radio access network, the method comprising:
    receiving, from a base station, a first control message including information on one or more frequencies for measurement;
    identifying whether an in device co-existence (IDC) interference is detected on a first set of at least one frequency among the one or more frequencies;
    if the IDC interference is detected on the first set of the at least one frequency, transmitting, to the base station, a second control message including information associated with the first set of the at least one frequency; and
    if the IDC interference is no longer detected on the first set of the at least one frequency, transmitting, to the base station, a third control message, wherein the third control message does not include the information associated with the first set of the at least one frequency.

2. The method of claim 1, wherein the IDC interference is detected on at least one frequency among the one or more frequencies when the terminal is configured to transmit an IDC indication.

3. The method of claim 1, wherein the first control message includes a radio resource control (RRC) message.

4. The method of claim 1, further comprising:
    identifying that the IDC interference is detected on a second set of at least one frequency among the one or more frequencies;
    if the IDC interference is detected on the second set of the at least one frequency, identifying whether the second set is different from the first set; and
    if the second set is different from the first set, transmitting, to the base station, a fourth control message for the second set of the at least one frequency, wherein the fourth control message includes information associated with the second set of the at least one frequency.

5. A method by a base station in a radio access network, the method comprising:
    transmitting, to a terminal, a first control message including information on one or more frequencies for measurement;
    receiving, from a terminal, a second control message for a first set of at least one frequency among the one or more frequencies if an in device co-existence (IDC) interference is detected on the first set of the at least one frequency, wherein the second control message includes information associated with the first set of the at least one frequency; and
    receiving, from the terminal, a third control message if the IDC interference is no longer detected on the first set of the at least one frequency, wherein the third control message does not include the information associated with the first set of the at least one frequency.

6. The method of claim 5, wherein the IDC interference is detected on at least one frequency among the one or more frequencies when the terminal is configured to transmit an IDC indication.

7. The method of claim 5, wherein the first control message includes a radio resource control (RRC) message.

8. The method of claim 5, further comprising:
receiving, from the terminal, a fourth control message for a second set of at least one frequency among the one or more frequencies if the IDC interference is detected on the second set of the at least one frequency which is different from the first set of the at least one frequency, wherein the fourth control message includes information associated with the second set of the at least one frequency.

9. A terminal in a radio access network, comprising:
a transceiver; and
at least one processor coupled with the transceiver and configured to control to:
receive, from a base station, a first control message including information on one or more frequencies for measurement,
identify whether an in device co-existence (IDC) interference is detected on a first set of at least one frequency among the one or more frequencies,
if the IDC interference is detected on the first set of the at least one frequency, transmit, to the base station, a second control message including information associated with the first set of the at least one frequency, and
if the IDC interference is no longer detected on the at least one frequency, transmit, to the base station, a third control message, wherein the third control message does not include the information associated with the first set of the at least one frequency.

10. The terminal of claim 9, wherein the IDC interference is detected on at least one frequency among the one or more frequencies when the terminal is configured to transmit an IDC indication.

11. The terminal of claim 9, wherein the first control message includes a radio resource control (RRC) message.

12. The terminal of claim 9, wherein the at least one processor is further configured to control to:
identify that the IDC interference is detected on a second set of at least one frequency among the one or more frequencies,
if the IDC interference is detected on the second set of the at least one frequency, identify whether the second set is different from the first set, and
if the second set is different from the first set, transmit, to the base station, a fourth control message for the second set of the at least one frequency, wherein the fourth control message includes information associated with the second set of the at least one frequency.

13. A base station in a radio access network, comprising:
a transceiver; and
at least one processor coupled with the transceiver and configured to control to:
transmit, to a terminal, a first control message including information on one or more frequencies for measurement,
receive, from a terminal, a second control message for at least one frequency among the one or more frequencies if an in device co-existence (IDC) interference is detected on the first set of the at least one frequency, wherein the second control message includes information associated with the first set of the at least one frequency, and
receive, from the terminal, a third control message if the IDC interference is no longer detected on the first set of the at least one frequency, wherein the third control message does not include the information associated with the first set of the at least one frequency.

14. The base station of claim 13, wherein the IDC interference is detected on at least one frequency among the one or more frequencies when the terminal is configured to transmit an IDC indication.

15. The base station of claim 13, wherein the first control message includes a radio resource control (RRC) message.

16. The base station of claim 13, wherein the at least one processor is further configured to control to:
receive, from the terminal, a fourth control message for a second set of at least one frequency among the one or more frequencies if the IDC interference is detected on the second set of the at least one frequency which is different from the first set of the at least one frequency, wherein the fourth control message includes information associated with the second set of the at least one frequency.

\* \* \* \* \*